United States Patent
Ide et al.

(10) Patent No.: US 11,605,002 B2
(45) Date of Patent: Mar. 14, 2023

(54) PROGRAM, INFORMATION PROCESSING METHOD, AND INFORMATION PROCESSING APPARATUS

(71) Applicant: Sony Corporation, Tokyo (JP)

(72) Inventors: Naoki Ide, Tokyo (JP); Yoshiyuki Kobayashi, Tokyo (JP); Akira Nakamura, Kanagawa (JP); Yukio Oobuchi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 494 days.

(21) Appl. No.: 16/637,269

(22) PCT Filed: Aug. 2, 2018

(86) PCT No.: PCT/JP2018/028986
§ 371 (c)(1),
(2) Date: Feb. 7, 2020

(87) PCT Pub. No.: WO2019/035364
PCT Pub. Date: Feb. 21, 2019

(65) Prior Publication Data
US 2020/0184341 A1    Jun. 11, 2020

(30) Foreign Application Priority Data
Aug. 16, 2017   (JP) .............................. JP2017-157214

(51) Int. Cl.
*G06N 3/08*    (2006.01)
*G06N 3/04*    (2006.01)
*G06N 3/088*   (2023.01)

(52) U.S. Cl.
CPC ........... *G06N 3/088* (2013.01); *G06N 3/0454* (2013.01)

(58) Field of Classification Search
CPC .... G06N 3/088; G06N 3/0454; G06N 3/0481; G06N 3/08
See application file for complete search history.

(56) References Cited

U.S. PATENT DOCUMENTS 10,498,609 B1 * 12/2019 Barbiro ................... H04L 41/16
2018/0300556 A1 * 10/2018 Varerkar ............... G06N 3/0445
(Continued)

FOREIGN PATENT DOCUMENTS

| JP | 3-33968 A | 2/1991 |
| JP | 8-249007 A | 9/1996 |

(Continued)

OTHER PUBLICATIONS

International Search Report and Written Opinion dated Nov. 6, 2018, 2018 for PCT/JP2018/028986 filed on Aug. 2, 2018, 11 pages including English Translation of the International Search Report.
(Continued)

*Primary Examiner* — Lewis G West
(74) *Attorney, Agent, or Firm* — Xsensus LLP

(57) ABSTRACT

The present technology relates to a program, an information processing method, and an information processing apparatus that make it possible to easily design network.
A program according to one aspect of the present technology is a program causing a computer to serve as: a generating unit that generates, in response to specification of a data set including data for learning, a network for inference execution and a network for learning corresponding to the data set; and a learning unit that inputs the data for learning to the network for learning and performs learning of the network for inference execution.
The present technology is applicable to a program that supports network design by Deep Learning.

17 Claims, 25 Drawing Sheets

(56) References Cited

U.S. PATENT DOCUMENTS

2020/0226012 A1\* 7/2020 Pitre .......................... G06F 9/54
2022/0222526 A1\* 7/2022 Hawkins ................... G06N 3/08
2022/0270297 A1\* 8/2022 Koh ...................... G06T 17/205

FOREIGN PATENT DOCUMENTS

| JP | 2000-231548 A | 8/2000 |
| JP | 2014-228995 A | 12/2014 |
| JP | 2015-52832 A | 3/2015 |
| JP | 2017-16414 A | 1/2017 |
| WO | 2015/008567 A1 | 1/2015 |

OTHER PUBLICATIONS

Ambai, Mitsuru et al., "Local feature description for keypoint matching", IEICE technical report, vol. 115, No. 388, Dec. 14, 2015, pp. 53-73 (See English Abstract).

Miyato, Gaku et al., "Regularization by Local Distributional Smoothing", IEICE technical report, vol. 115, No. 323, Nov. 19, 2015, pp. 257-264 (See English Abstract).

Okanohara, Daisuke, "Generative Adversarial Networks," Nikkei robotics May issue, Apr. 10, 2016, pp. 36-37.

\* cited by examiner

FIG. 8

| DATA ID | ITEM 1 | ITEM 2 | ITEM 3 | LABEL |
|---|---|---|---|---|
| 200111 | 0.1 | 0.2 | 0.3 | 0.1 |
| 200112 | : | : | : | 5.3 |
| 200113 | : | : | : | 6.55 |
| 200114 | : | : | : | 5.2 |
| 200115 | : | : | : | 1.3 |

FIG. 11

| DATA ID | ITEM 1 | ITEM 2 | ITEM 3 | LABEL |
|---|---|---|---|---|
| 200111 | 0.1 | 0.2 | 0.3 | 0 |
| 200112 | ... | ... | ... | 5 |
| 200113 | ... | ... | ... | 6 |
| 200114 | ... | ... | ... | 5 |
| 200115 | ... | ... | ... | 1 |

FIG. 18

LABELED DATA

| DATA ID | ITEM 1 | ITEM 2 | ITEM 3 | LABEL |
|---|---|---|---|---|
| 200111 | 0.1 | 0.2 | 0.3 | 0.1 |
| 200112 | : | : | : | 5.3 |
| 200113 | : | : | : | 6.55 |
| 200114 | : | : | : | 5.2 |
| 200115 | : | : | : | 1.3 |

UNLABELED DATA

| DATA ID | ITEM 1 | ITEM 2 | ITEM 3 |
|---|---|---|---|
| 200111 | 0.1 | 0.2 | 0.3 |
| 200112 | : | : | : |
| 200113 | : | : | : |
| 200114 | : | : | : |
| 200115 | : | : | : |

PROGRAM, INFORMATION PROCESSING METHOD, AND INFORMATION PROCESSING APPARATUS

CROSS-REFERENCE TO RELATED APPLICATIONS

The present application is based on PCT filing PCT/JP2018/028986, filed Aug. 2, 2018, which claims priority to JP 2017-157214, filed Aug. 16, 2017, the entire contents of each are incorporated herein by reference.

TECHNICAL FIELD

The present technology relates to a program, an information processing method, and an information processing apparatus, and specifically to a program, an information processing method, and an information processing apparatus that make it possible to easily design a network.

BACKGROUND ART

In designs of Deep Network for learnings (neural networks), it has been necessary for a designer to decide a final layer and a loss function in accordance with kinds of issues desired to be solved. These designs include, for example, designs such as a design using a squared error in a case of a regression issue and a design using a cross entropy loss in a case of a classification issue. It can be said that such designs are established ways.

The established ways of designs are not limited to ways by the regression issue and the classification issue. For example, an established way in a case of metric learning is using a Siamese network or a triplet (Triplet) network. In addition, an established way in a case where a generative model is created is using a variable autoencoder (VAE (Variational Auto Encoder)) or a GAN (Generative Adversarial Network) for learning the generative model, and an established way in a case of semi-supervised learning is using VAT (Virtual Adversarial Training)

CITATION LIST

Non-Patent Literature

NPTL 1: TensorFlow: Large-Scale Machine Learning on Heterogeneous Distributed Systems <URL: https://static-.googleusercontent.com/media/research.google.com/enfi-pubs/archive/45166.pdf>

SUMMARY OF THE INVENTION

Problems to be Solved by the Invention

Selection of the loss function and Selection of a network for learning structure as described above depend heavily on knowledge of a designer. Accordingly, for a designer having less knowledge, these selections are major obstacles to designing an appropriate network.

The present technology has been devised in view of such circumstances, and make it possible to easily design a network.

Means for Solving the Problem

A program according to one aspect of the present technology is a program causing a computer to serve as: a generating unit that generates, in response to specification of a data set including data for learning, a network for inference execution and a network for learning corresponding to the data set; and a learning unit that inputs the data for learning to the network for learning and performs learning of the network for inference execution.

In one aspect of the present technology, the network for inference execution and the network for learning corresponding to the data set are generated in response to specification of the data set including the data for learning, and the data for learning is inputted to the network for learning, and learning of the network for inference execution is performed.

Effect of the Invention

According to the present technology, a user is allowed to easily design a network.

It is to be noted that the effects described here are not necessarily limited, and any effect described in the present disclosure may be exhibited.

BRIEF DESCRIPTION OF DRAWING

FIG. 8 is a diagram illustrating a first example of a data set in a regression issue.

FIG. 11 is a diagram illustrating a first example of a data set in a classification issue.

FIG. 18 is a diagram illustrating a first example of a data set in metric learning.

MODES FOR CARRYING OUT THE INVENTION

Embodiments of the present technology are described below. Description is given in the following order.
1. Automatic Network Generation Function
2. Configuration and Operation of PC
3. Specific Examples of Networks Corresponding to Respective Issues
4. Others

1. Automatic Network Generation Function

1-1. About Network Design Support Program

Figure 1:
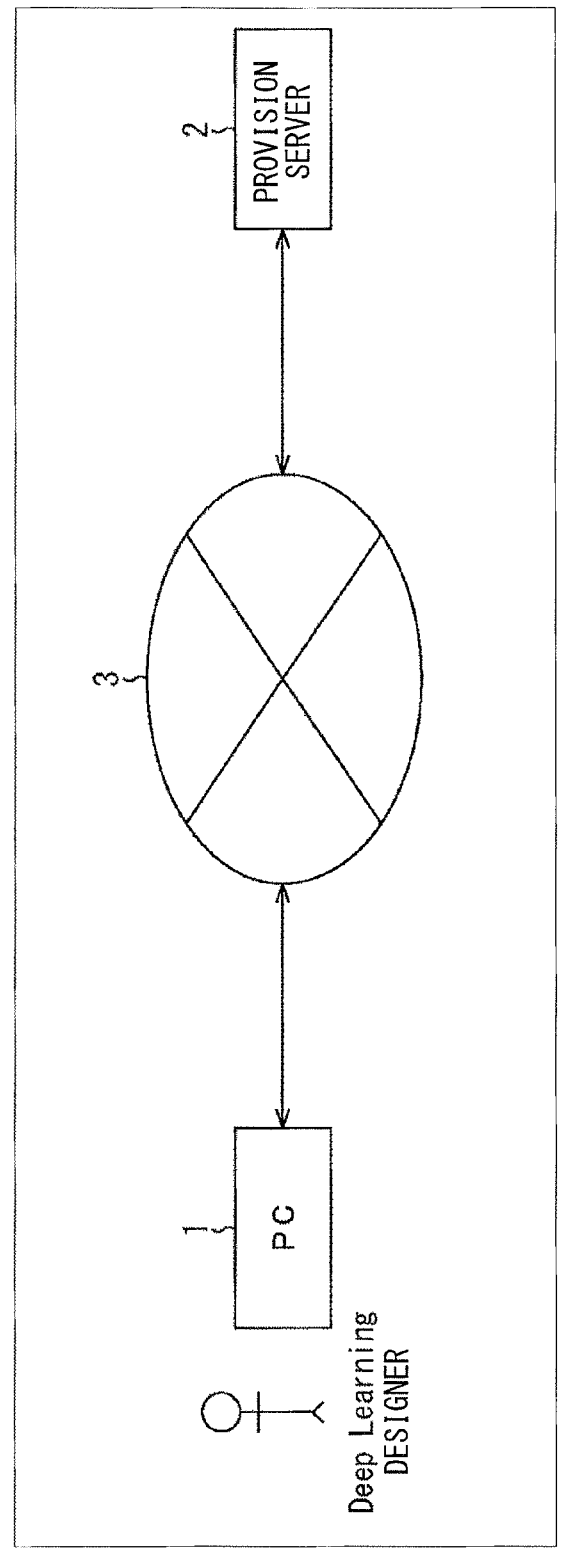
FIG. 1 is a diagram illustrating a configuration example of a provision system, which provides a program, according to an embodiment of the present technology.

FIG. 1 is a diagram illustrating a configuration example of a provision system, which provides a program, according to an embodiment of the present technology.

The provision system illustrated in FIG. 1 is configured by coupling a PC 1 and a provision server 2 to each other via a network 3 such as the Internet.

The PC 1 is, for example, an apparatus used by a designer who designs a network for Deep Learning. A program provided by the provision server 2 is installed in the PC 1, and a network is designed with use of the program.

The program provided by the provision server 2 is a program for supporting network design. Hereinafter, the program provided by the provision server 2 is referred to as a network design support program as appropriate.

In the network design support program, various tools for designing a network are prepared. A user of the network design support program uses a function of the network design support program, which makes it possible to perform design, learning, evaluation, and the like of a network.

Figure 2:
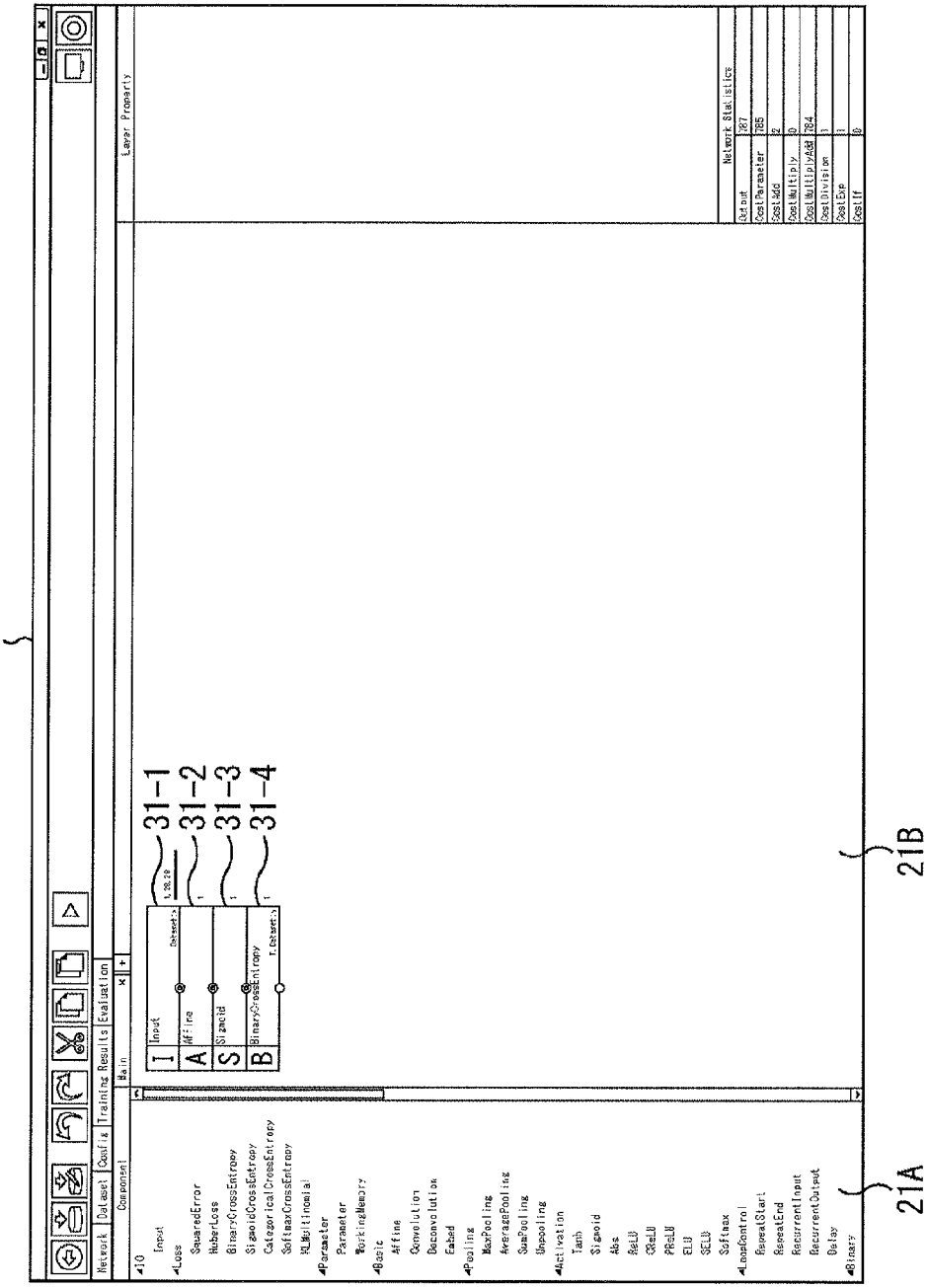
FIG. 2 is a diagram illustrating an example of a display screen of a network design support program.

FIG. 2 is a diagram illustrating an example of a display screen of the network design support program.

A tool bar in which buttons used for tool selection are disposed side by side is displayed in an upper portion of a window 21, and a selection region 21A and a model display region 21B are formed below the tool bar.

The selection region 21A in a vertically long strip shape is a region used for selection of various components included in a network. In the example in FIG. 2, each of the components is displayed separately for each category such as "IO", "Loss", "Parameter", "Basic", "Pooling", "Activation", and "LoopControl".

For example, "SquaredError", "HuberLoss", "BinaryCrossEntropy", "SingmoidCrossEntropy", "SoftmaxCrossEntropy" and "KLmultinominal" are prepared as components of "Loss". In addition, items such as "Affine", "Convolution", "Deconvolution" and "Embed" are prepared as components of "Basic". Items such as "Tan h", "Sigmoid" and "Abs" are prepared as components of "Activation".

The model display region 21B is a display region of a network designed with use of components prepared in the selection region 21A. In the example in FIG. 2, respective components "Input", "Affine", "Sigmoid" and "BinaryCrossEntropy" are selected in order, thereby displaying blocks 31-1 to 31-4 representing the respective components in a superimposed manner. The blocks 31-1 to 31-4 represent a network (a learner) including an input layer, a linear layer, an activation layer, and a loss function layer.

In a case where the user specifies a data set for learning and provides an instruction for execution of learning, learning using this network is performed. Selecting components from the selection region 21A in such a manner makes it possible for the user to design a network.

The network design support program has a function of automatically constructing a network on the basis of an issue to be solved by the user from an inference using a network and a data set specified by the user. In the network design support program, information relating to an established way to design a network is set corresponding to a kind of the issue and contents of the data set.

Examples of the issue include the following kinds of issues.
(1) Regression issue
(2) Classification issue
(3) Metric learning (feature extraction with use of a result of metric learning)
(4) Semi-supervised learning (regression and classification issues with use of a result of semi-supervised learning)
(5) Generative model (generation of data with use of a generative model)

Such issues are provided to the network design support program by being specified by the user. As will be described later, it is possible to estimate issues by the network design support program on the basis of a data set and the like. In a case where estimation of issues to be solved by the user is performed by the network design support program, the user only specifies a data set, thereby automatically generating a network corresponding to the data set.

The data set includes a data set for learning and a data set for evaluation. The data set may include only the data set for learning and may not include the data set for evaluation. The data set includes, for example, data of the following domains.
(1) Image (a moving image and a still image)
(2) Sound
(3) Item
(4) Text It is to be noted that sensor data is treated as data of the same domain as the domain of sound. The sensor data measured by various sensors such as an acceleration sensor, a gyroscopic sensor, a temperature sensor, a humidity sensor, and a biometric sensor (such as a heart rate sensor and a blood pressure sensor) are also used for network learning and the like.

The network automatically generated by an established design is presented to the user by a screen as illustrated in FIG. 2. The user is allowed to design a desired network by appropriately adding a change to the presented network. The network that is automatically generated by the network design support program and presented to the user is a standard network, and the desired network is designed by adding a change to the standard network.

As described above, only specifying an issue desired to be solved and a data set via an interface makes it possible to obtain a standard network, which makes it possible for the user to greatly reduce time necessary to design a network.

In addition, even in a case where the user has less knowledge about network design, the user is allowed to easily design a network.

1-2. About Network

Hereinafter, description is given of basic points of a network.

Figure 3:
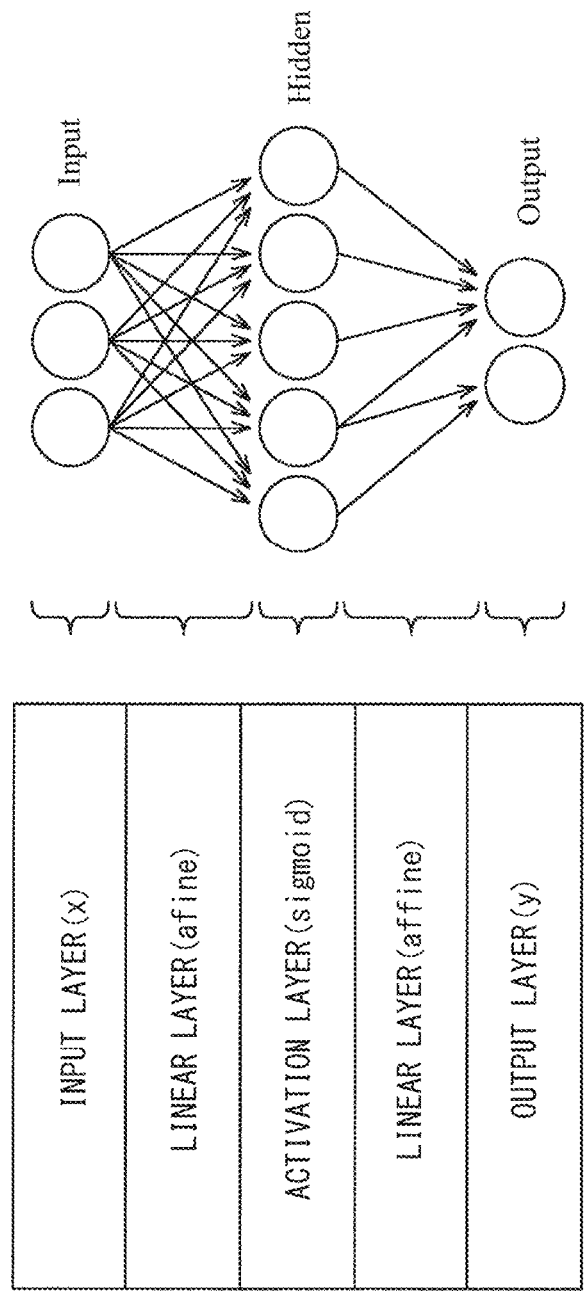
FIG. 3 is a diagram illustrating a structure of a network.

FIG. 3 is a diagram illustrating a structure of a network.

As illustrated in an upper stage of FIG. 3, a neural network is formed by superimposing a linear layer and an activation layer and adding an input layer and an output layer. In an example in FIG. 3, a three-layer neural network is illustrated.

The linear layer is a layer that performs a linear transformation of a variable (a vector). An output y is expressed as a value obtained by multiplying each input by a weight and adding a bias b, as represented by the following expression (1), where an input to the linear layer is x and a weight to each input is w. The weight w is a parameter to be optimized by learning.

[Math. 1]

$$y = w_1 x_1 + w_2 x_2 + b \quad (1)$$

The activation layer is a layer that performs a nonlinear transformation of a variable. The activation layer (often) has no parameter to be learned. A Sigmoid function, which is one of activation functions, is represented by the following expression (2).

[Math. 2]

$$y = \frac{1}{1 + \exp(-x)} \quad (2)$$

The blocks 31-1 to 31-4 in FIG. 2 are images schematically illustrating such a network.

Figure 4:
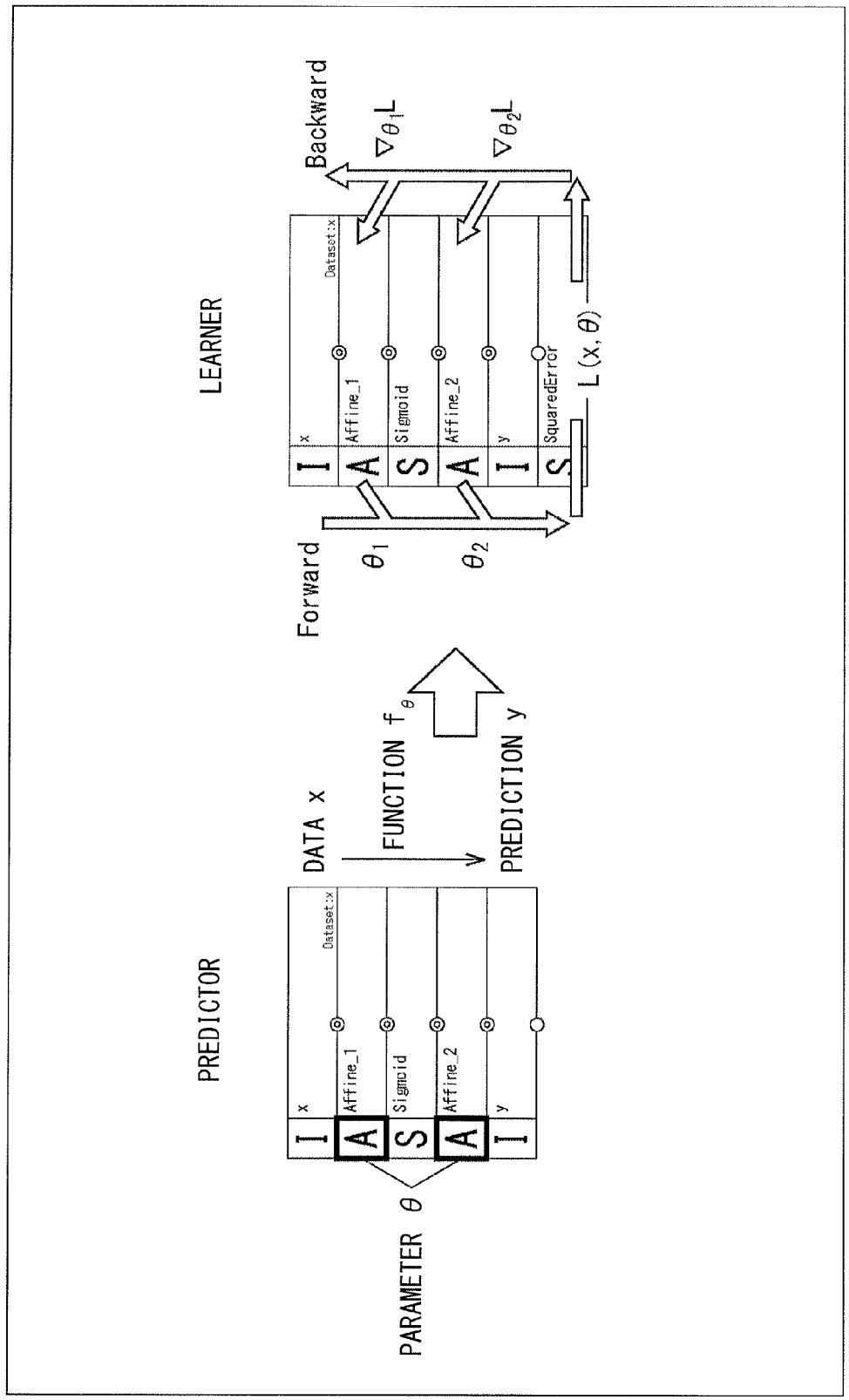
FIG. 4 is a diagram illustrating an example of learning.

FIG. 4 is a diagram illustrating an example of learning.

In a case where the issue to be solved is a regression issue, a predictor as illustrated on the left side in FIG. 4 is used. A predicted value y is represented by the following expression (3), where an input to the predictor is represented as data x, and a transformation from the input to an output is collectively represented as a function fθ.

[Math. 3]

$$y = f_\theta(x) \quad (3)$$

A parameter of such a predictor is learned with use of a learner in which a loss function is provided in a final layer of the predictor, as indicated by a white arrow. A loss is an error between a predicted value and a label of data (a true value), and is set in accordance with an issue. In the example in FIG. 4, a function for performing squared error computation is set as the loss function.

Learning with use of the learner is performed by adding a gradient to each parameter to update the parameter while propagating a gradient of a calculated loss backwards (a gradient method) to determine a parameter for minimizing the loss (an error backpropagation method).

2. Configuration and Operation of PC

2-1. Configuration of PC

Figure 5:
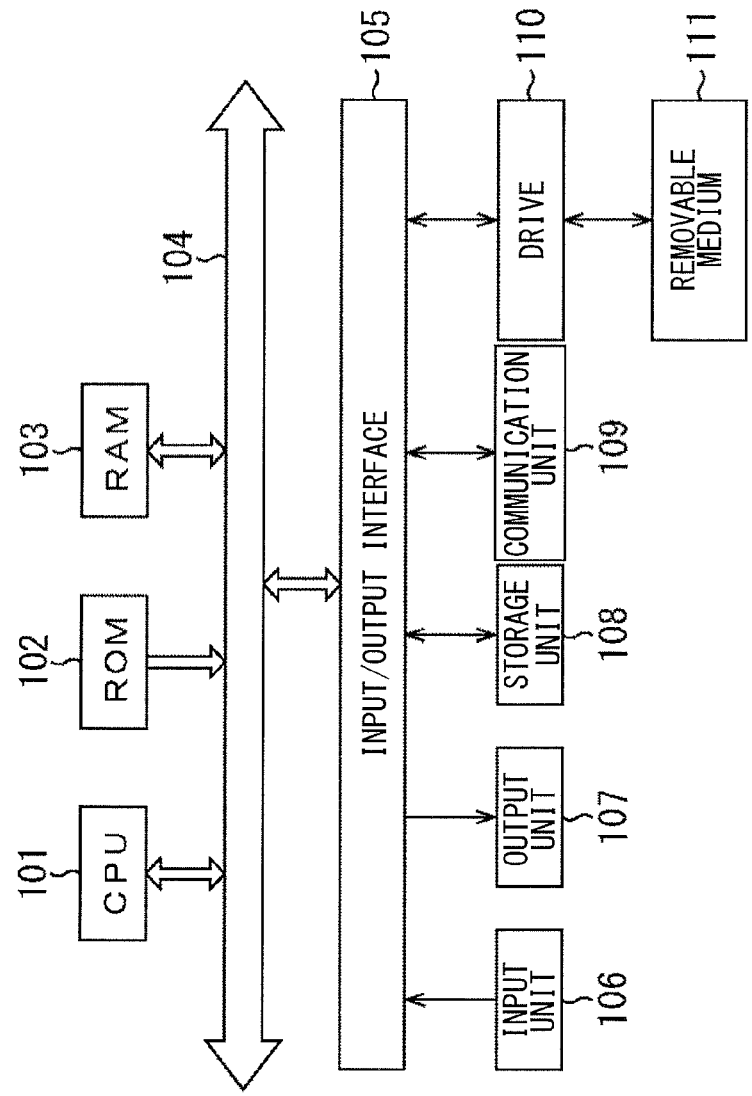
FIG. 5 is a block diagram illustrating a configuration example of a PC.

FIG. 5 is a block diagram illustrating a configuration example of the PC 1.

A CPU (Central Processing Unit) 101, a ROM (Read Only Memory) 102, and a RAM (Random Access Memory) 103 are coupled to each other by a bus 104.

A input/output interface 105 is further coupled to the bus 104. An input unit 106, an output unit 107, a storage unit 108, a communication unit 109, and a drive 110 are coupled to the input/output interface 105. A removable medium 111 is coupled to the drive 110.

The input unit 106 includes a keyboard, a mouse, and the like. Operations such as specification of an issue is performed with use of the input unit 106.

The output unit 107 includes a display, a speaker, and the like. A screen as described with reference to FIG. 2 is displayed on the display included in the output unit 107.

The storage unit 108 includes a hard disk, a nonvolatile memory, and the like. The storage unit 108 stores the network design support program described above.

The communication unit 109 includes a network interface and the like. Various types of communication such as communication for downloading the network design support program are performed in the communication unit 109. The network design support program may be installed not via communication but via the removable medium 111. In this case, the removable medium 111 in which the network design support program is stored is coupled to and read by the drive 110.

In the PC 1 having a configuration as described above, the CPU 101 loads the network design support program stored in the storage unit 108 into the RAM 103 and executes the network design support program, thereby performing processing for network design.

Figure 6:
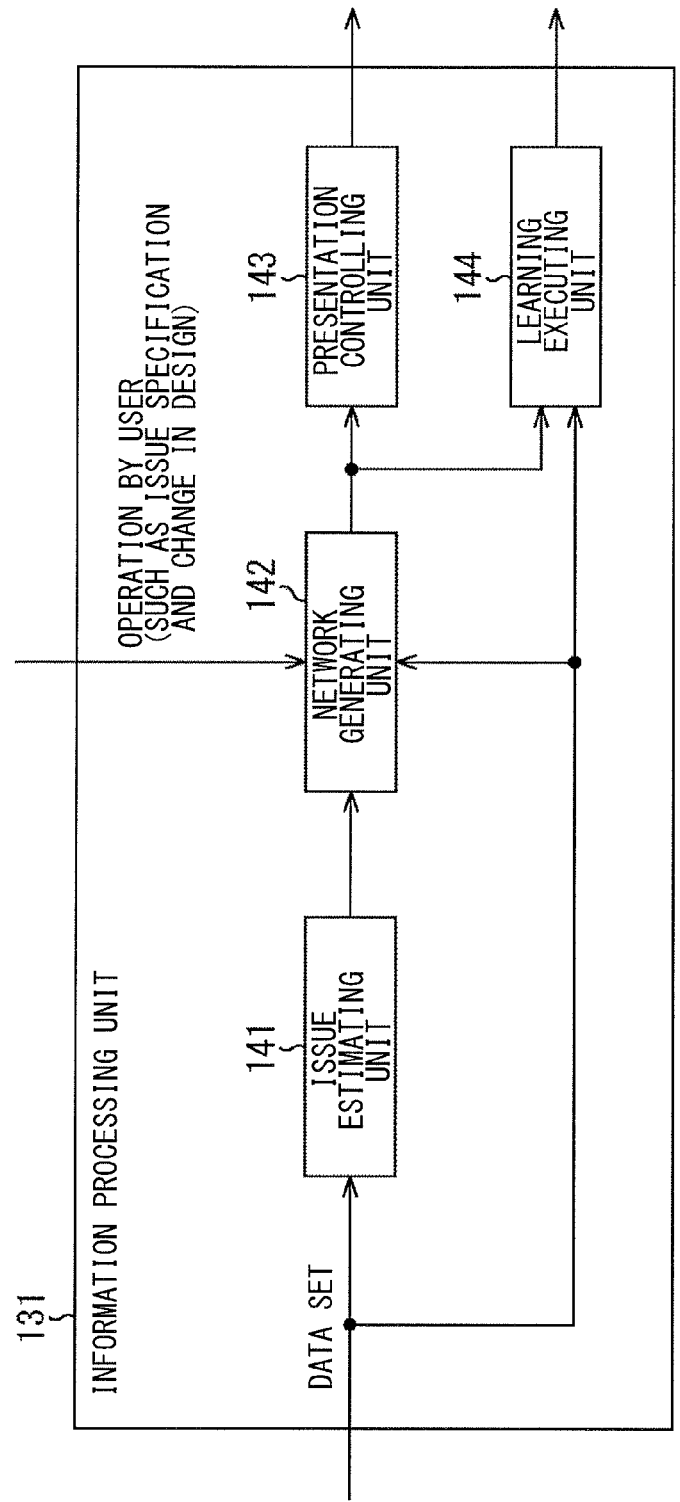
FIG. 6 is a block diagram illustrating a functional configuration example of the PC.

FIG. 6 is a block diagram illustrating a functional configuration example of the PC 1.

An information processing unit 131 illustrated in FIG. 6 is implemented by executing the network design support program by the CPU 101. As illustrated in FIG. 6, the information processing unit 131 includes an issue estimating unit 141, a network generating unit 142, a presentation controlling unit 143, and a learning executing unit 144. A data set including data for learning is inputted to the issue estimating unit 141, the network generating unit 142, and the learning executing unit 144.

The issue estimating unit 141 analyzes the data set and estimates an issue to be solved by the user. The issue estimating unit 141 estimates any one of five issues described above, for example. Information representing a result of estimation of the issue is provided to the network generating unit 142. In a case where the issue to be solved is specified by the user, the issue is not estimated by the issue estimating unit 141.

The network generating unit 142 generates a reasoner (a network for inference execution) and a learner (a network for learning) on the basis of the issue estimated by the issue estimating unit 141 and the data set. In the network generating unit 142, information relating to an established design corresponding to the issue and the data set is set in advance. The network generating unit 142 generates a network based on the established design regardless of an operation by the user.

It is to be noted that, in a case where the issue estimating unit 141 does not estimate the issue, the network generating unit 142 generates a network on the basis of the issue specified by the user and the data set. Information relating to the network generated by the network generating unit 142 is supplied as information relating to a default network to the presentation controlling unit 143 and the learning executing unit 144.

In addition, after generating the default network, the network generating unit 142 changes the default network in response to an operation by the user. Information about the changed network is also supplied to the presentation controlling unit 143 and the learning executing unit 144.

The presentation controlling unit 143 displays the network generated by the network generating unit 142 on the screen of the network design support program and presents the network to the user. The screen of the network design support program is provided with information about the default network as well as display for selection of various tools for making a change to the network.

The learning executing unit 144 executes learning with use of a learner generated by appropriately making a change to the network by the user. Data for learning included in the data set is used for learning by the learning executing unit 144. A reasoner obtained by learning is provided to an application included in the PC 1, an application included in an external apparatus of the PC 1, or the like, and is used for inference processing.

The PC 1 may serve as an interface that accepts an operation by the user and presents, to the user, information for designing a network, and respective functions such as estimation of an issue, generation of a network, and execution of learning may be prepared in an external apparatus such as the provision server 2. In this case, at least a portion of the configuration illustrated in FIG. 6 is implemented by the external apparatus.

<2-2. Operation of PC>

Hereinafter, description is given of automatic network generation processing by the information processing unit 131 having a configuration as described above with reference to a flowchart in FIG. 7.

In step S1, the issue estimating unit 141 obtains a data set including data for learning.

In step S2, the issue estimating unit 141 performs issue estimation processing. An issue to be solved by the user is estimated through the issue estimation processing on the basis of the data set. The issue estimation processing will be described in detail later.

In step S3, the network generating unit 142 generates a reasoner corresponding to the data set and the issue.

In step S4, the network generating unit 142 generates a learner by adding a loss function corresponding to the issue to the reasoner.

In step S5, the presentation controlling unit 143 uses the reasoner and the learner generated by the network generating unit 142 as default networks, and displays information relating to the default networks on the screen of the network design support program.

In step S6, the network generating unit 142 changes the network presented by the presentation controlling unit 143 on the basis of an operation by the user.

In step S7, the learning executing unit 144 inputs the data for learning included in the data set to the learner and executes learning in response to an instruction for execution of learning.

In step S8, the learning executing unit 144 outputs a reasoner obtained by learning to outside, and ends the processing.

As described above, estimation of the issue is performed by the network design support program, which makes it possible for the user to generate a network only by specifying the data set including the data for learning. In addition, even in a case where estimation of the issue is not performed, it is possible for the user to generate a network only by specifying the issue and the data set.

3. Specific Examples of Networks Corresponding to Respective Issues

Hereinafter, description is given of specific examples of the reasoner and the learner automatically generated corresponding to the issue to be solved by the user. Redundant description is omitted as appropriate 3-1. Regression Issue The regression issue predicts data assuming a continuous value. A network generated as a reasoner serves as a predictor.

3-1-1. Flow of Learning in Regression Issue (1) Precondition

The user desires to input data and create a predictor that predicts another data (a continuous value). Examples of such a predictor include a predictor that predicts (assesses) a price of a real estate property by inputting various kinds of information about the real estate property. In addition to predicting the price of the real estate property, the examples include a predictor that predicts a position (coordinates) of a specific object from an image, a predictor that estimates a position of a sound source from sound, and a predictor that predicts, form sensor data, another sensor value.

In this case, the user creates such a predictor by providing data and a true value (label) to the network design support program and causing the network design support program to perform learning.

(2) Advance Preparation

The user prepares a data set in advance. The data set desirably includes a data set for learning and a data set for evaluation, but may include only the data set for learning. In the data set for learning and the data set for evaluation, each data and a label are managed in association with each other.

For example, a file in which a label corresponding to each data is recorded, and a file system in which a file of data and a file of a label are stored is prepared as a data set.

(3) Execution

The user specifies the data set for learning, and instructs a system (the network design support program) to design a predictor. In the system, it is estimated from the data set for learning that an issue to be solved by the user is a regression issue, and a standard predictor and a standard learner in the regression issue are generated. The standard learner is generated by adding a standard loss function to the standard predictor.

A structure of the standard predictor is identified on the basis of a domain of data used for prediction. The domain of the data used for prediction is estimated on the basis of an extension of a file included in the data set for learning, or the like. The domain may be inputted by the user.

The standard loss function is identified on the basis that the issue to be solved is the regression issue.

The automatically generated standard predictor and the automatically generated standard learner are presented to the user by displaying source codes of networks on a display, or by displaying, on a screen, an image illustrating module structures of the networks as described with reference to FIG. 2.

The user makes a change (for example, a change on the basis of prior knowledge, or trial and error on the basis of evaluation) to the presented networks as necessary, and provides an instruction for execution of learning.

In the system, learning with use of the data set for learning is performed to generate a predictor. Finally, the user provides the predictor obtained by the learning to outside.

3-1-2. Examples of Data Set

FIG. 8 is a diagram illustrating a first example of the data set.

In the example in FIG. 8, a data ID is set to data of each sample, and is managed in association with a label of a continuous value. Each data includes values of respective items such as Item 1, Item 2, and Item 3. In a case where a predictor that predicts a price of a real estate property is created, the items include data that contributes to determining the price, such as a distance from a station, the number of stories, and years after construction, and the label is a value (for example, a decimal value) representing a contract price.

As described above, in a case where the user writes the values of the items directly, it is possible to configure the data set for learning with a single file in which data and labels are summarized.

In a case where the data set for learning as illustrated in FIG. 8 is inputted, in the system, the issue to be solved by the user is estimated to be a regression issue on the basis that the label is not an integer value, for example. The user may specify that the issue to be solved is a regression issue.

In addition, in the system, on the basis that each data includes the value of then item, the domain of the data is specified as an item.

Figure 9:
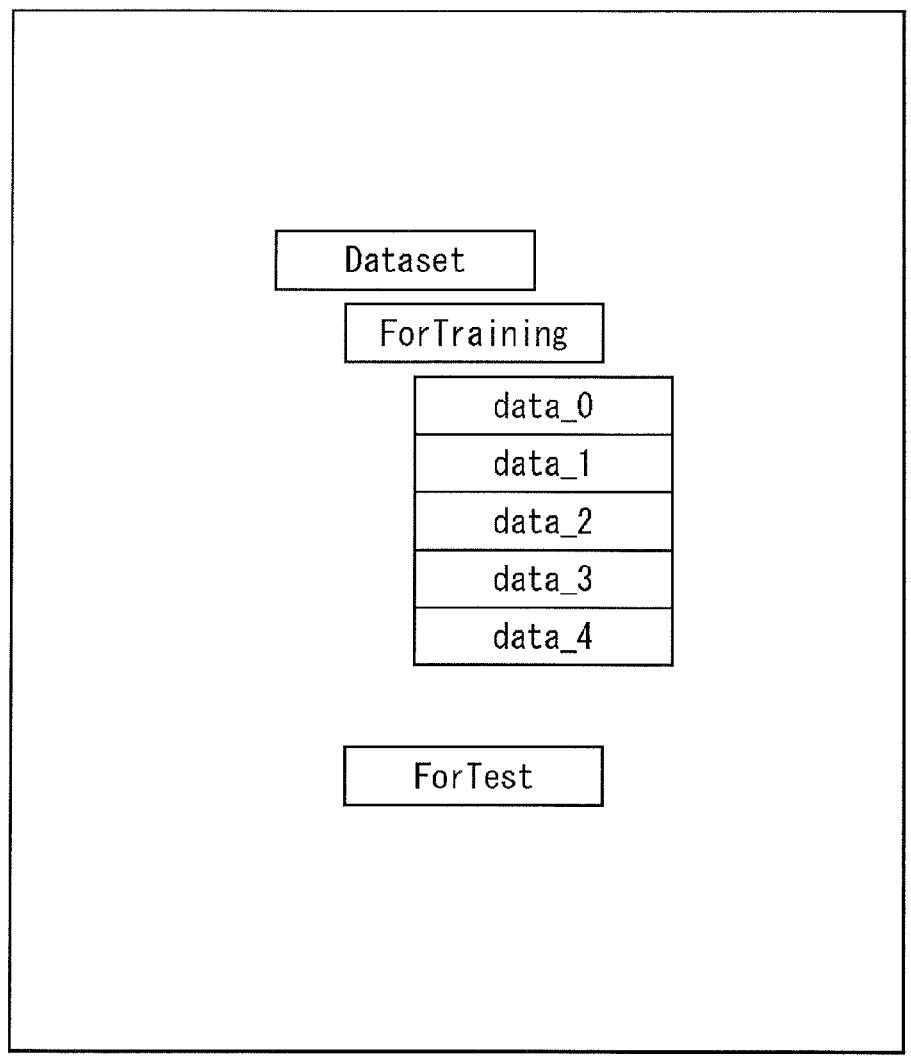
FIG. 9 is a diagram illustrating a second example of the data set in the regression issue.

FIG. 9 is a diagram illustrating a second example of the data set.

In a file system in FIG. 9, respective files having file names "data_0," "data_1," "data_2," "data_3," and "data_4" are stored as the data set for learning in a directory of "ForTraining". Each of the files is a file of an image, music, or the like. A file of a label is also stored as appropriate. Files included in the data set for evaluation are stored in a directory of "ForTest".

As described above, it is possible to configure the data set for learning with a file system in which files in association with labels are stored.

In a case where the data set for learning as illustrated in FIG. 9 is inputted, in the system, it is estimated on the basis of a configuration of the file system that the issue to be solved by the user is a regression issue. For example, a file system that has a configuration indicating that the issue to be solved is a regression issue is prepared as the data set for learning. The user may specify that the issue to be solved is a regression issue.

In addition, in the system, a domain of data is specified on the basis of an extension of a file, such as music in a case of wav or mp3, a still image in a case of png, jpeg, or bmp, a moving image in a case of mp4 or wmv, and a text in a case of txt.

3-1-3. Standard Network in Regression Issue

Figure 10:
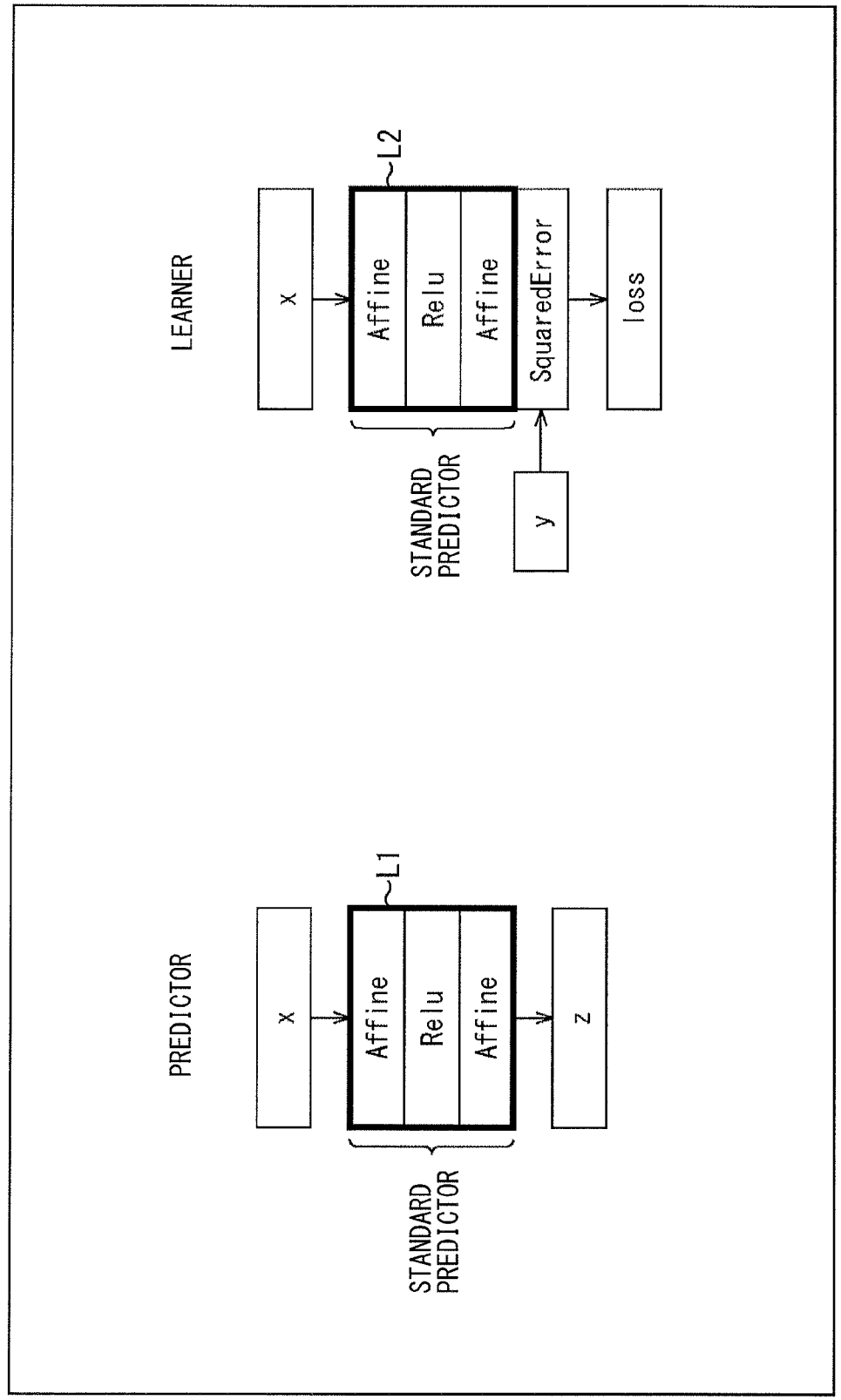
FIG. 10 is a diagram illustrating examples of a predictor and a learner.

FIG. 10 is a diagram illustrating examples of a predictor and a learner.

As illustrated on the left side in FIG. 10, the predictor includes a standard predictor in the regression issue. The standard predictor is configured by superimposing a fully connected layer (an Affine layer), an activation layer (a Relu layer), and a fully connected layer (an Affine layer) in this order from the top. An input layer (x) and an output layer (z) are added to a network of the standard predictor.

In contrast, as illustrated on the right side in FIG. 10, the learner is configured by adding a layer of a squared error function to the standard predictor.

Parameters are common between parameters of the standard predictor in the predictor, which are surrounded by a thick line L1, and parameters of the standard predictor in the learner, which are surrounded by a thick line L2. In a case where the parameters in the learner are updated by learning, the parameters in the predictor is also updated in a similar manner.

As described above, in the regression issue, adding the layer of the squared error function to the standard predictor to form a learner is an established design. In addition, using a linear layer as a final layer of the predictor is an established design.

Whether the linear layer is a convolution layer or a fully connected layer is selected in accordance with a domain of specified data. For example, the convolution layer is selected in a case where the domain of the data is an image or sound, and the fully connected layer is selected in a case where the domain of the data is an item or a text. FIG. 10 illustrates examples of default networks in a case where the domain of the data is an item or a text.

In a case where the domain of the data is an image or sound, it is possible to adopt a network such as a Lenet or a Resnet including a convolution layer as a standard predictor. In addition, in a case where the domain of the data is an item or a text, it is possible to adopt a network including an Embed layer as a standard predictor.

It is to be noted that Resnet is disclosed in the following literature.

Deep Residual Learning for Image Recognition <https://arxiv.org/abs/1512.03385>

The predictor and the learner as illustrated in FIG. 10 are automatically generated and presented to the user as default networks. Information relating to the two networks may be presented side by side or separately. On a presentation screen of the networks, a message to prompt a change in design, such as "Please remodel this" may be displayed near the standard predictor.

3-2. Classification Issue

The classification issue classifies inputted data into a category to which the inputted data belongs. The classification issue is divided into a binary classification issue having two classes and a multiclass classification issue having three or more classes. A network generated as a reasoner serves as a classifier.

3-2-1. Flow of Learning in Classification Issue (1) Precondition

The user desires to input data and create a classifier that classifies the data into a category (a discrete value) to which the data belongs. Examples of such a classifier include a classifier that classifies the image for each type of flower by inputting an image showing a flower, and a classifier that classifies the image for each type of animal by inputting an image showing an animal.

In this case, the user creates such a classifier by providing data and a label to the network design support program and causing the network design support program to perform learning.

(2) Advance Preparation

The user prepares a data set in advance. The data set desirably includes a data set for learning and a data set for evaluation, but may include only a data set for learning. In the data set for learning and the data set for evaluation, each data and a label are managed in association with each other.

For example, a file in which a label corresponding to each data is recorded and a file system in which a file of data classified for each label in advance is stored is prepared as a data set.

(3) Execution

The user specifies the data set for learning, and instructs the system to design a classifier. In the system, it is estimated from the data set for learning that an issue to be solved by the user is a classification issue, and a standard classifier and a standard learner in the classification issue are generated.

The standard learner is generated by adding a standard loss function to the standard classifier.

A structure of the standard classifier is identified on the basis of a domain of data used for classification. The domain of the data used for classification is estimated on the basis of an extension of a file included in the data set for learning, or the like. The domain may be inputted by the user.

The standard loss function is identified on the basis that the issue to be solved is the classification issue.

The automatically generated standard classifier and the automatically generated standard learner are presented to the user by displaying source codes of networks on a display, or by displaying an image illustrating module structures of the networks.

The user makes a change to the presented networks as necessary, and provides an instruction for execution of learning.

In the system, learning with use of the data set for learning is performed to generate a classifier. Finally, the user provides the classifier obtained by the learning to outside.

3-2-2. Examples of Data Set

FIG. 11 is a diagram illustrating a first example of the data set.

In the example in FIG. 11, a data ID is set to data of each sample, and is managed in association with a label of a discrete value. Each data includes values of respective items such as Item 1, Item 2, and Item 3. In a case where a classifier that performs classification by type of flower in an image is created, the items include data that characterizes the type of flower such as the number of stamens and the number of petals, and the label is an integer value representing the type of flower.

As described above, in a case where the user writes the values of the items directly, it is possible to configure the data set for learning with a single file in which data and labels are summarized.

In a case where the data set for learning as illustrated in FIG. 11 is inputted, in the system, the issue to be solved by the user is estimated to be a classification issue on the basis that the label is an integer value, for example. The user may specify that the issue to be solved is a classification issue.

In addition, in the system, on the basis that there are two or more kinds of integer values representing labels, the classification issue is estimated to be a multiclass classification issue. In a case where there are two kinds of integer values representing labels, the classification issue is estimated to be a binary classification issue. As described above, in a case of the classification issue, the number of categories for classification is also estimated on the basis of the data set for learning.

Figure 12:
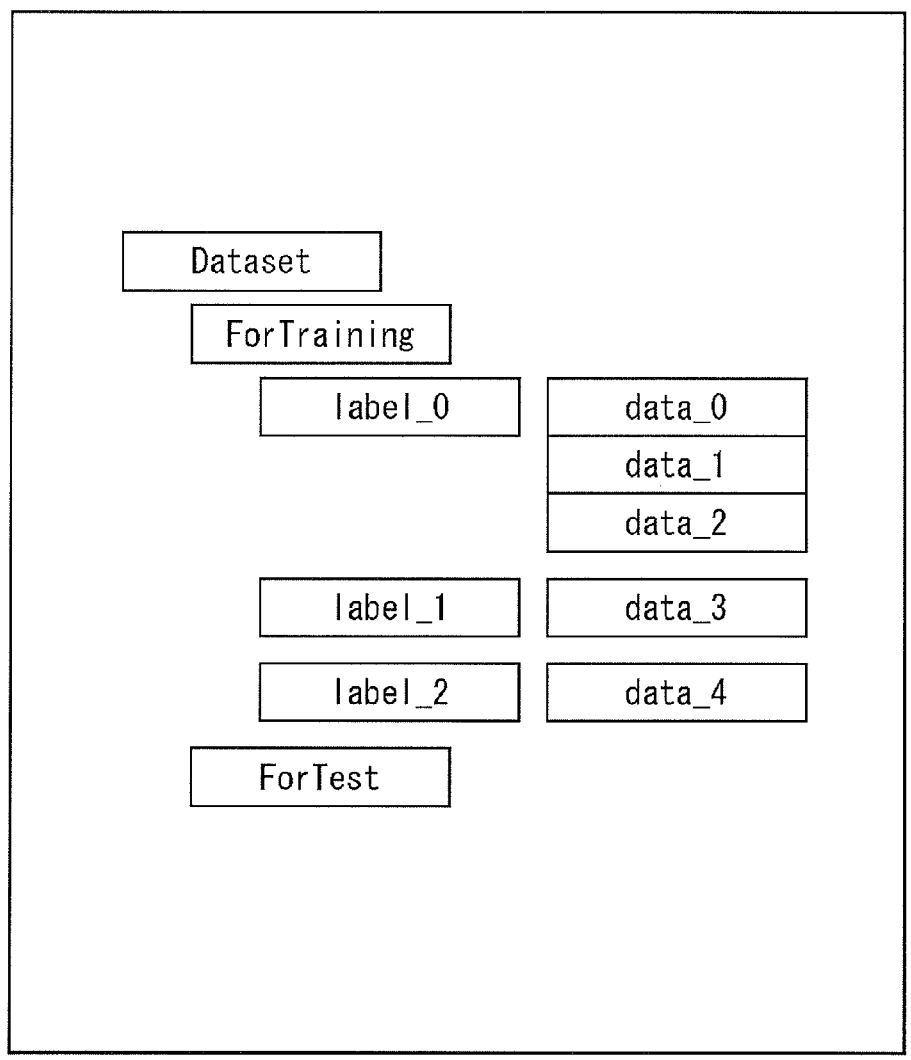
FIG. 12 is a diagram illustrating a second example of the data set in the classification issue.

FIG. 12 is a diagram illustrating a second example of the data set.

In a file system in FIG. 12, respective directories of "label_0", "label_1", and "label_2" are set below a directory of "ForTraining". Respective files having file names "data_0", "data_1", and "data_2" are stored in the directory of "label_0". A file having a file name "data_3" is stored in the directory of "label_1", and a file having a file name "data_4" is stored in the directory of "label_2". Each of the files is a file of an image, music, or the like.

The directories of "label_0", "label_1", and "label 2" represent labels of data of files stored in the respective directories.

As described above, it is possible to configure the data set for learning with a file system in which files classified into respective directories representing labels are stored.

In a case where the data set for learning as illustrated in FIG. 12 is inputted, in the system, it is estimated on the basis of a configuration of the file system that the issue to be solved by the user is a classification issue and the number of categories is three. The user may specify that the issue to be solved is a classification issue.

In addition, in the system, a domain of data is specified on the basis of an extension of a file.

3-2-3. Standard network in Classification Issue

Figure 13:
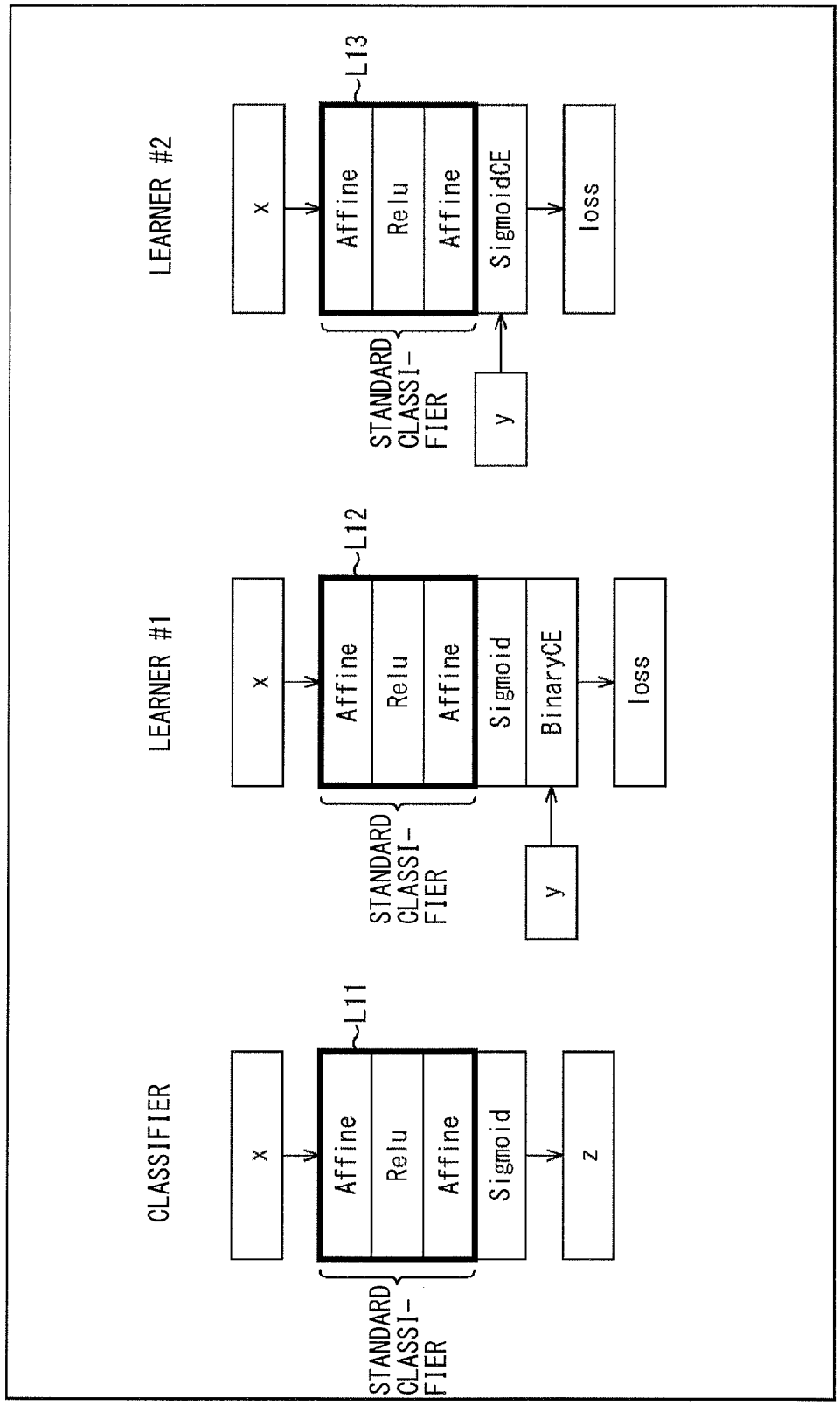
FIG. 13 is a diagram illustrating examples of a classifier and learners in a binary classification issue.

FIG. 13 is a diagram illustrating examples of a classifier and learners in the binary classification issue.

As illustrated on the left side in FIG. 13, the classifier includes a standard classifier in the binary classification issue. The standard classifier is configured by superimposing a fully connected layer (an Affine layer), an activation layer (a Relu layer), and a fully connected layer (an Affine layer) in this order from the top. A Sigmoid function is set to a final layer below the standard classifier to obtain an output representing soft binary classification (probability). An input layer (x) and an output layer (z) are added to a network of the standard classifier.

In contrast, as illustrated in the middle and on right side in FIG. 13, two learners, i.e., a learner #1 and a learner #2 are generated.

The learner #1 is configured by adding a layer of a Sigmoid function and a layer of a BinaryCE (binary cross entropy) function to the standard classifier.

The learner #2 is configured by adding a layer of a SigmoidCE function to the standard classifier. Thus, it is possible to practically use, as a final layer, the layer of the SigmoidCE function instead of the layers of the Sigmoid function and the BinaryCE function.

Parameters are common between parameters of the standard classifier in the classifier, which are surrounded by a thick line L11, and parameters of the standard classifier in the learners, which are surrounded by thick lines L12 and L13. In a case where the parameters in the learners are updated by learning, the parameters in the classifier are also updated in a similar manner.

As described above, in the binary classification issue, adding the layers of the Sigmoid function and the BinaryCE function or the layer of the SigmoidCE function to the standard classifier to from a learner is an established design.

Whether the linear layer is a convolution layer or a fully connected layer is selected in accordance with a domain of specified data. For example, the convolution layer is selected in a case where the domain of the data is an image or sound, and a fully connected layer is selected in a case where the domain of the data is an item or a text.

The classifier and the learners #1 and #2 as illustrated in FIG. 13 are automatically generated and presented to the user as default networks. Information relating to the three networks may be presented side by side or separately. On a presentation screen of the networks, a message to prompt a change in design, such as "Please remodel this" may be displayed near the standard classifier.

Figure 14:
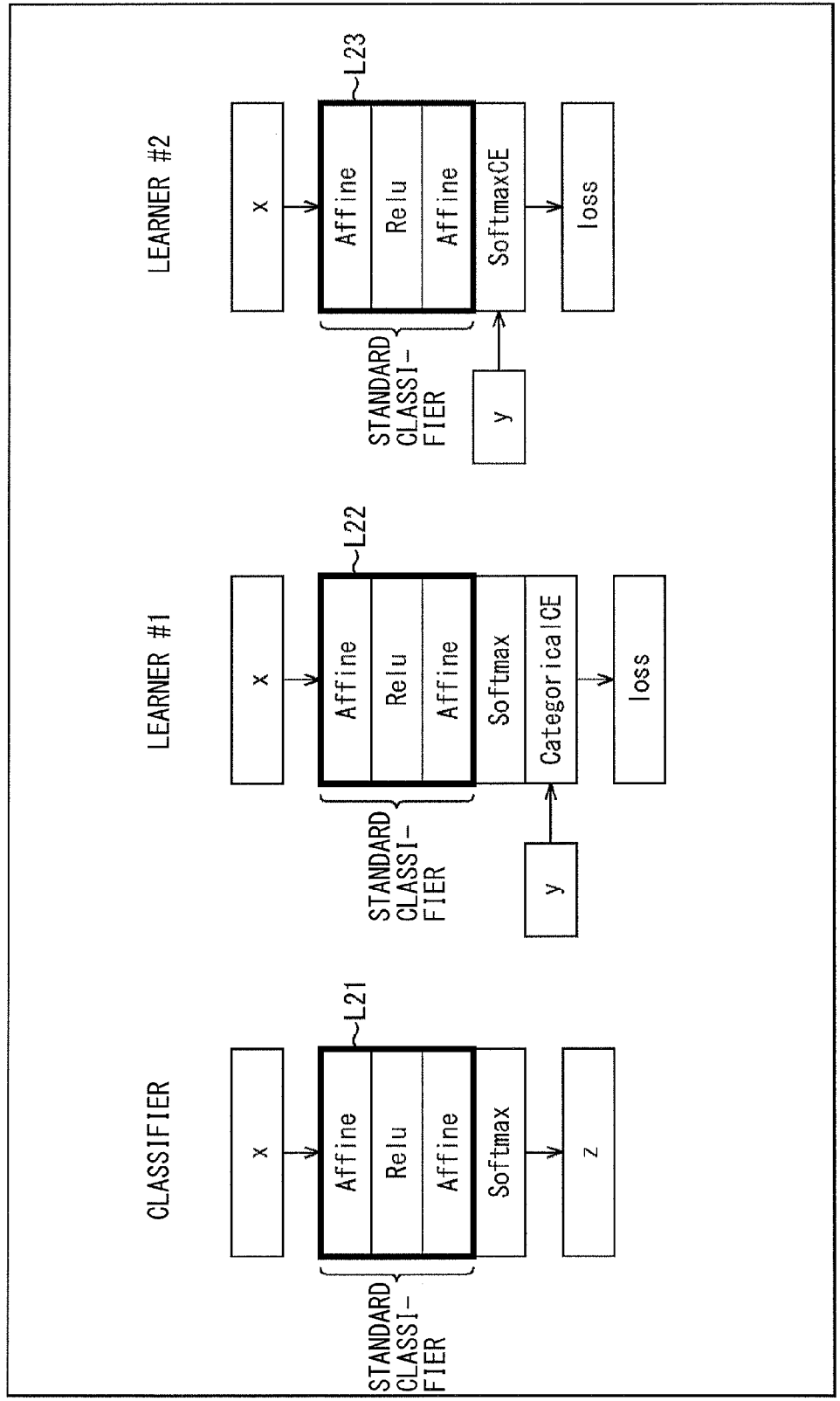
FIG. 14 is a diagram illustrating examples of a classifier and learners in a multiclass classification issue.

FIG. 14 is a diagram illustrating examples of a classifier and learners in the multiclass classification issue.

As illustrated on the left side in FIG. 14, the classifier includes a standard classifier in the multiclass classification issue. The standard classifier is configured by superimposing a fully connected layer (an Affine layer), an activation layer (a Relu layer), and a fully connected layer (an Affine layer) in this order from the top. A Softmax function is set to a final layer below the standard classifier to obtain an output representing soft multiclass classification (probability). An input layer (x) and an output layer (z) are added to a network of the standard classifier.

In contrast, as illustrated in the middle and on right side in FIG. 14, two learners, i.e., a learner #1 and a learner #2 are generated.

The learner #1 is configured by adding a layer of a Softmax function and a layer of a CategoricalCE (categorical cross entropy) below the standard classifier.

The learner #2 is configured by adding a layer of a SoftmaxCE function below the standard classifier. Thus, it is possible to practically use, as a final layer, the layer of the SoftmaxCE function instead of the layers of the Softmax function and the CategoricalCE function.

Parameters are common between parameters of the standard classifier in the classifier, which are surrounded by a thick line L21, and the parameters of the standard classifier in the learners, which are surrounded by thick lines L22 and L23. In a case where the parameter in the learners are updated by learning, the parameters in the classifier are also updated in a similar manner.

As described above, in the multiclass classification issue, adding the layers of the Softmax function and the CategoricalCE function or the layer of the SoftmaxCE function to the standard classifier to form a learner is an established design.

Whether the linear layer is a convolution layer or a fully connected layer is selected in accordance with a domain of specified data. For example, the convolution layer is selected in a case where the domain of the data is an image or sound, and a fully connected layer is selected in a case where the domain of the data is an item or a text.

The classifier and the learners #1 and #2 as illustrated in FIG. 14 are automatically generated and presented to the user as default networks. Information relating to the three networks may be presented side by side or separately. On a presentation screen of the networks, a message to prompt a change in design, such as "Please remodel this" may be displayed near the standard classifier.

3-2-4. Design of Feedforward Network

Figure 15:
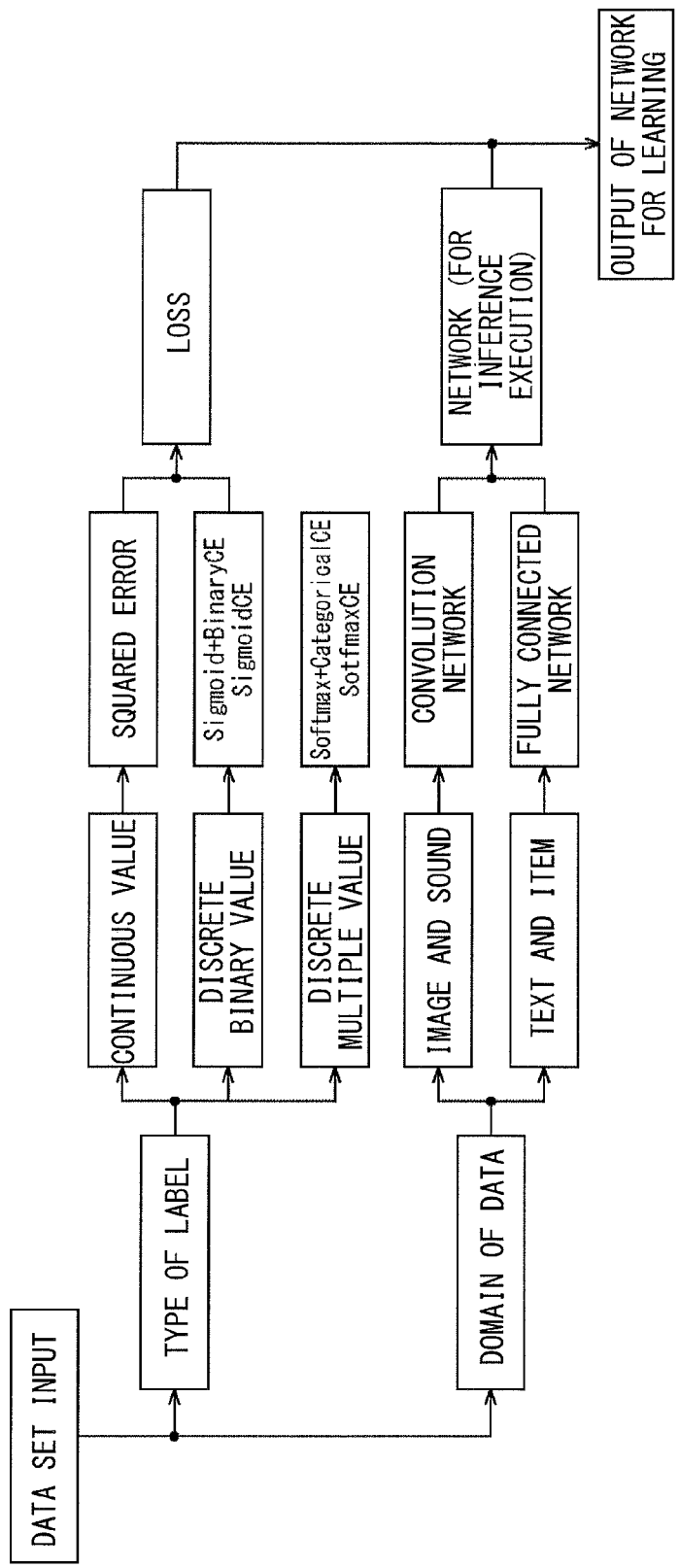
FIG. 15 is a diagram summarizing established designs of networks.

FIG. 15 is a diagram summarizing established designs of networks used in the regression issue and the classification issue as described above. The network generating unit 142 in FIG. 6 has information relating to such established designs.

In a case where a type of the label is a continuous value (in a case where a value of the label is a decimal value), it is estimated that the regression issue is to be solved and a squared error function is selected as a loss function.

In a case where the type of the label is a discrete binary value (in a case where the value of the label includes two types of integer values), it is estimated that the binary classification issue is to be solved, and a combination of the Sigmoid function and the BinaryCE function, or the SigmoidCE function is selected as a loss function.

In a case where the type of the label is a discrete multiple value (in a case where the value of the label includes three or more types of integer values), it is estimated that the multiclass classification issue is to be solved, and a combination of the Softmax function and the CategoricalCE function, or the SoftmaxCE function is selected as a loss function.

A learner is automatically generated by adding layers of these loss functions to a network of the standard reasoner, and is presented to the user.

Whether the linear layer is a convolution layer or a fully connected layer is selected in accordance with a domain of specified data. The convolution layer is selected in a case where the domain of the data is an image or sound, and the fully connected layer is selected in a case where the domain of the data is a text or an item.

As described above, a network including the convolution layer selected in accordance with the domain of data or a network including the fully connected layer selected in accordance with the domain of data is automatically generated as a standard reasoner, and are presented to the user.

3-3. Metric Learning

Metric learning (feature space learning) is learning in which a method of embedding data in a feature space is estimated. A network generated as a reasoner serves as a feature extractor.

3-3-1. Flow of Metric Learning (1) Precondition

The user desires to input data and create a feature extractor that projects the data on a feature space. The feature extractor is used, for example, in an application that performs matching between pre-registered data and inputted data (determines whether the pre-registered data and the inputted data are the same as or different from each other).

For example, in a case where an image of a handwritten number "2" is inputted with no label, using the feature extractor makes it possible to select an image of "2" having a thickness, a gradient, and the like close to those of the image of the handwritten number "2". In addition, it is possible to perform identification, authentication, and tracking of a predetermined object as described later.

In this case, the user creates such a feature extractor by providing data and a label to the network design support program and causing the network design support program to perform metric learning.

(2) Advance Preparation

The user prepares a data set in advance. The data set desirably includes a data set for learning and a data set for evaluation, but may include only a data set for learning. In the data set for learning and the data set for evaluation, each data and a label are managed in association with each other.

For example, a data set similar to the data set used in the classification issue is used in the metric learning.

(3) Execution

The user specifies the data set for learning, and instructs the system to design a feature extractor. In the system, it is estimated to perform metric learning, and a standard feature extractor and a standard learner in the metric learning are generated. The standard learner is generated by adding a standard loss function to a network including the standard feature extractor.

A structure of the standard feature extractor is identified on the basis of a domain of data used for feature extraction. The domain of the data used for feature extraction is estimated on the basis of an extension of a file included in the data set for learning, or the like. The domain may be inputted by the user.

The standard loss function is identified on the basis that a learning method is metric learning. Losses in metric learning include a Siamese loss and a Triplet loss. It is to be noted that, herein, in contrast to the Triplet loss, a loss used in a Siamese network is referred to as Siamese loss for convenience. The system or the user may select which of the Siamese loss and the Triplet loss is to be used.

The automatically generated standard feature extractor and the automatically generated standard learner are presented to the user by displaying source codes of networks on a display, or by displaying an image illustrating module structures of the networks.

The user makes a change to the presented networks as necessary, and provides an instruction for execution of learning.

In the system, learning with use of the data set for learning is performed to generate a feature extractor. Finally, the user provides the feature extractor obtained by the learning to outside.

3-3-2. Standard Network in Metric Learning

Figure 16:
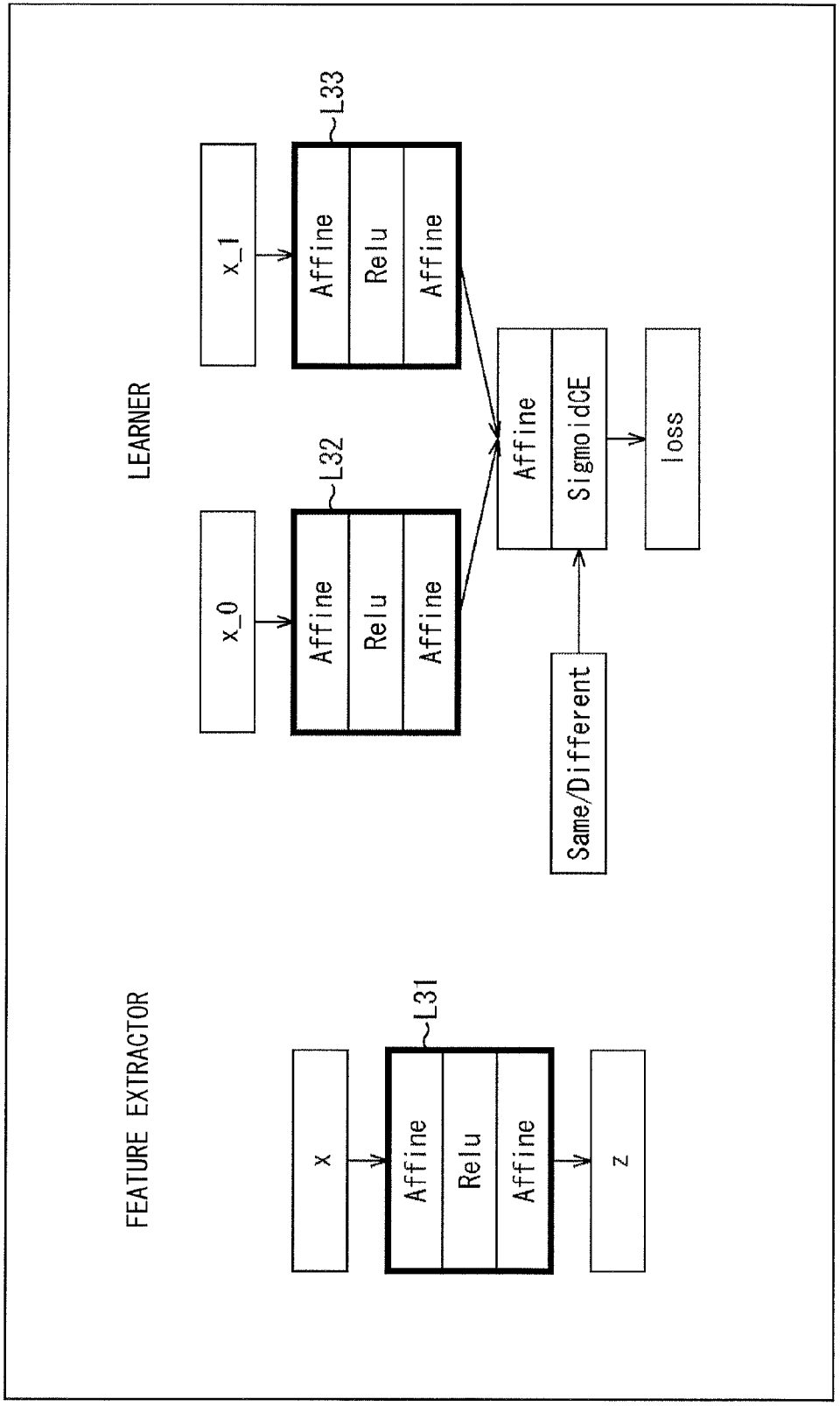
FIG. 16 is a diagram illustrating examples of a feature extractor and a learner using a Siamese loss.

FIG. 16 is a diagram illustrating examples of a feature extractor and a learner using the Siamese loss. Metric learning in a case where the Siamese loss is used is performed with use of a learner configured as a Siamese network.

As illustrated on the left side in FIG. 16, the feature extractor include a standard feature extractor. The standard feature extractor is configured by superimposing a fully connected layer (an Affine layer), an activation layer (a Relu layer), and a fully connected layer (an Affine layer) in this order from the top. An input layer (x) and an output layer (z) are added to a network of the standard feature extractor.

In contrast, as illustrated on the right side in FIG. 16, a Siamese network is generated as a learner. The Siamese network is configured by disposing, side by side, two standard feature extractors having different inputs. Data x_0 inputted to the standard feature extractor surrounded by a thick line L32 and data x_1 inputted to the standard feature extractor surrounded by a thick line L33 may be combined randomly, but randomness is desirably controlled to cause a combination of the same labels to appear sufficiently.

The Siamese network is configured by adding a fully connected layer (an Affine layer) and a layer of the SigmoidCE function below the two standard feature extractors. Data representing a position of each of the data x_0 and the data x_1 on the feature space is inputted to the fully connected layer.

It is to be noted that a label (Same/Different) inputted to the layer of the SigmoidCE function represents whether or not the labels of the data x_0 and the data x_ are the same as each other. For example, in a case where a value given as the label is 0, the label represents that the labels of the data x_0 and the data x_1 are the same as each other, and in a case where the value given as the label is 1, the label represents that the labels of the data x_0 and the data x_1 are different from each other.

Parameters are common between parameters of the standard feature extractor in the feature extractor, which are surrounded by a thick line L31, and parameters of the standard feature extractors in the Siamese network, which are surrounded by thick lines L32 and L33. In a case where the parameters in the Siamese network are updated by learning, the parameters in the feature extractor are also updated in a similar manner.

Metric learning by the Siamese network is performed to determine a parameter that causes a distance (|f(x0)−f(x1)|) between outputs of the standard feature extractors to become smaller in a case where the labels of the data x_0 and the data x_1 are the same as each other and become larger in a case where the labels of the data x_0 and the data x_1 are different from each other.

As described above, in the metric learning, the Siamese network serves as a standard network included in the learner.

Whether the linear layer is a convolution layer or a fully connected layer is selected in accordance with a domain of specified data. For example, the convolution layer is selected in a case where the domain of the data is an image or sound, and the fully connected layer is selected in a case where the domain of the data is an item or a text.

The feature extractor and the learner as illustrated in FIG. 16 are automatically generated and presented to the user as default networks. Information relating to the two networks may be presented side by side or separately. On a presentation screen of the networks, a message to prompt a change in design, such as "Please remodel this" may be displayed near the standard feature extractor.

Figure 17:
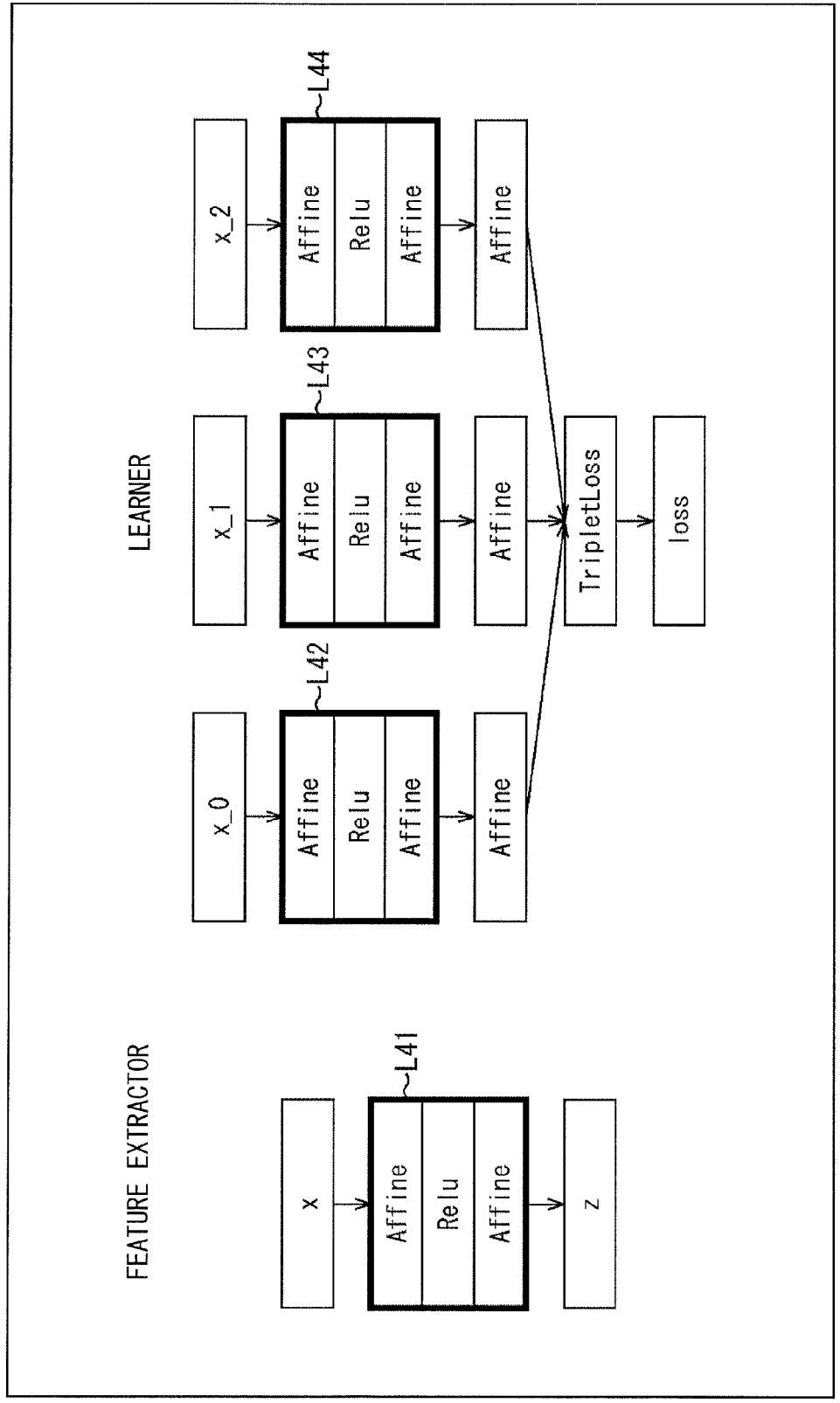
FIG. 17 is a diagram illustrating examples of a feature extractor and a learner using a Triplet loss.

FIG. 17 is a diagram illustrating examples of the feature extractor and a learner using the Triplet loss. Metric learning in a case where the Triplet loss is used is performed with use of a learner configured as a Triplet network.

The feature extractor illustrated on the left side in FIG. 17 is the same as the feature extractor in FIG. 16.

As illustrated on the right side in FIG. 17, a Triplet network is generated as a learner. The Triplet network is configured by disposing, side by side, three standard feature extractors having different inputs. Data x_0 inputted to the standard feature extractor surrounded by a thick line L42 and data x_1 inputted to the standard feature extractor surrounded by a thick line L43 are, for example, data of different samples to which the same label is set as label_0 or label_1. The data x_0 is randomly selected from the data set for learning. In contrast, data x_2 inputted to the standard feature extractor surrounded by a thick line L44 is data to which a label different from the label of the data x_0 is set.

The Triplet network is configured by adding a fully connected layer (an Affine layer) under each of the three standard feature extractors. Data representing a position of each of the data x_0, the data x_1, and the data x_2 on the feature space is inputted to the fully connected layer.

A layer that determines the Triplet loss is added below each of the fully connected layers. The Triplet loss becomes small in a case where a distance between the data x_0 and the data x_1 having the same label is small, and becomes small in a case where a distance between the data x_0 and the data x_2 having different labels is large. The Triplet loss is represented by the following expression (4). In the expression (4), a is a parameter called a margin, and, for example, 1 is set to a.

[Math. 4]

$$L(x, \theta) = \sum_k \max\{0, |f(x\_0) - f(x\_1)|^2 - |f(x\_0) - f(x\_2)|^2 + \alpha\} \quad (4)$$

Parameters are common between parameters of the standard feature extractor in the feature extractor, which are surrounded by a thick line L41, and parameters of the standard feature extractors in the Triplet network, which are surrounded by the thick lines L42, L43, and L44. In a case where the parameters in the Triplet network are updated by learning, the parameters in the feature extractor are also updated in a similar manner.

As described above, in the metric learning, the Triplet network serves as a standard network included in the learner.

Whether the linear layer is a convolution layer or a fully connected layer is selected in accordance with a domain of specified data. For example, the convolution layer is selected in a case where the domain of the data is an image or sound, and the fully connected layer is selected in a case where the domain of the data is an item or a text.

The feature extractor and the learner as illustrated in FIG. 17 are automatically generated and presented to the user as default networks. Information relating to the two networks may be presented side by side or separately. On a presentation screen of the networks, a message to prompt a change in design, such as "Please remodel this" may be displayed near the standard feature extractor.

3-3-3. Application Example of Metric Learning Using Siamese/Triplet network

Using the metric learning makes it possible to first register predetermined data such as an image and sound and determine whether or not newly inputted data is the same as the registered data. Such a technology is used in a facial identification application and an object tracking application, for example.

In facial identification, a person is identified by collating an inputted facial image with a list of facial images registered in advance. By learning, a feature extractor is constructed with use of a feature contributing to determining whether the person is the same person and a different person of facial features.

Facial identification with use of metric learning is disclosed in the following literature, for example.

DeepFace—Closing the Gap to Human-Level Performance in Face Verification, Taigman <https://research.fb.com/publications/deepface-closing-the-gap-to-human-level-performance-in-face-verification/>

Triplet Similarity Embedding for Face Verification, Sankaranarayanan <https://arxiv.org/abs/1602.03418>

In object tracking, an object specified in a first frame of frames included in a moving image is detected from the subsequent frames. Object tracking with use of metric learning is disclosed in the following literature, for example.

Fully-Convolutional Siamese Networks for Object Tracking, Bertinetto <https://arxiv.org/abs/1606.09549>

It is to be noted that the Triplet network is disclosed in the following literature, for example.

Deep metric learning using Triplet network, Hoffer <https://arxiv.org/abs/1412.6622>

<3-4. Semi-supervised Learning>

Semi-supervised learning is learning with use of labelled data and unlabeled data. A network generated as a reasoner serves as a predictor in a case where an issue to be solved is a regression issue, and serves as a classifier in a case where an issue to be solved is a classification issue. The regression issue and the classification issue are described above, and redundant description thereof is omitted as appropriate.

3-4-1. Flow Semi-supervised Learning (1) Precondition

The user has labelled data and unlabeled data, and desires to create a predictor that predicts another data or a classifier that classifies inputted data into a category to which the inputted data belongs.

In this case, the user creates a predictor or a classifier by providing the labelled data and the unlabeled data to the network design support program and causing the network design support program to perform semi-supervised learning.

(2) Advance Preparation

The user prepares a data set in advance. The data set desirably includes a data set for learning and a data set for evaluation, but may include only a data set for learning. The data set for learning includes both a labeled data set in which a label is associated with each data and an unlabeled data set in which a label is not associated with each data. The data set for evaluation includes a labeled data set.

For example, a file system in which a pair of a file of the labeled data set and a file of the unlabeled data set, a file of the labeled data set, and a file of the unlabeled data set are stored separately is prepared as a data set.

(3) Execution

The user specifies the data set for learning, and instructs the system to design networks. In the system, it is estimated from the data set for learning to perform semi-supervised learning. In addition, in the system, it is estimated whether an issue to be solved by the user is a regression issue or a classification issue.

In a case where it is estimated that the issue to be solved by the user is a regression issue, a standard predictor and a standard learner are generated to solve the regression issue. The standard learner is generated by adding a standard loss function to the standard predictor.

In addition, in a case where it is estimated that the issue to be solved by the user is a classification issue, a standard classifier and a standard learner are generated to solve the classification issue. The standard learner is generated by adding a standard loss function to the standard classifier.

The automatically generated standard network is presented to the user by displaying source codes of the networks on a display or by displaying an image illustrating module structures of the networks on the display.

The user makes a change to the presented networks as necessary, and provides an instruction for execution of learning.

In the system, semi-supervised learning with use of the data set for learning is performed to generate a predictor or a classifier. Finally, the user provides the predictor or the classifier by the learning to outside.

3-4-2. Examples of Data Set

FIG. 18 is a diagram illustrating a first example of the data set.

As illustrated in FIG. 18, in a case of semi-supervised learning, a labeled data set and an unlabeled data set are prepared. The labeled data set illustrated on the left side is the same as the data set in FIG. 8, and each data is managed in association with a label. In contrast, the unlabeled data set illustrated on the right side does not include labels.

In a case where the data set for learning as illustrated in FIG. 18 is inputted, in the system, on the basis that the data set for learning includes the labeled data set and the unlabeled data set, it is estimated to perform semi-supervised learning.

In addition, in the example in FIG. 18, the issue to be solved by the user is estimated to be a regression issue on the basis that the label is not an integer value. The user may specify the issue to be solved.

Figure 19:
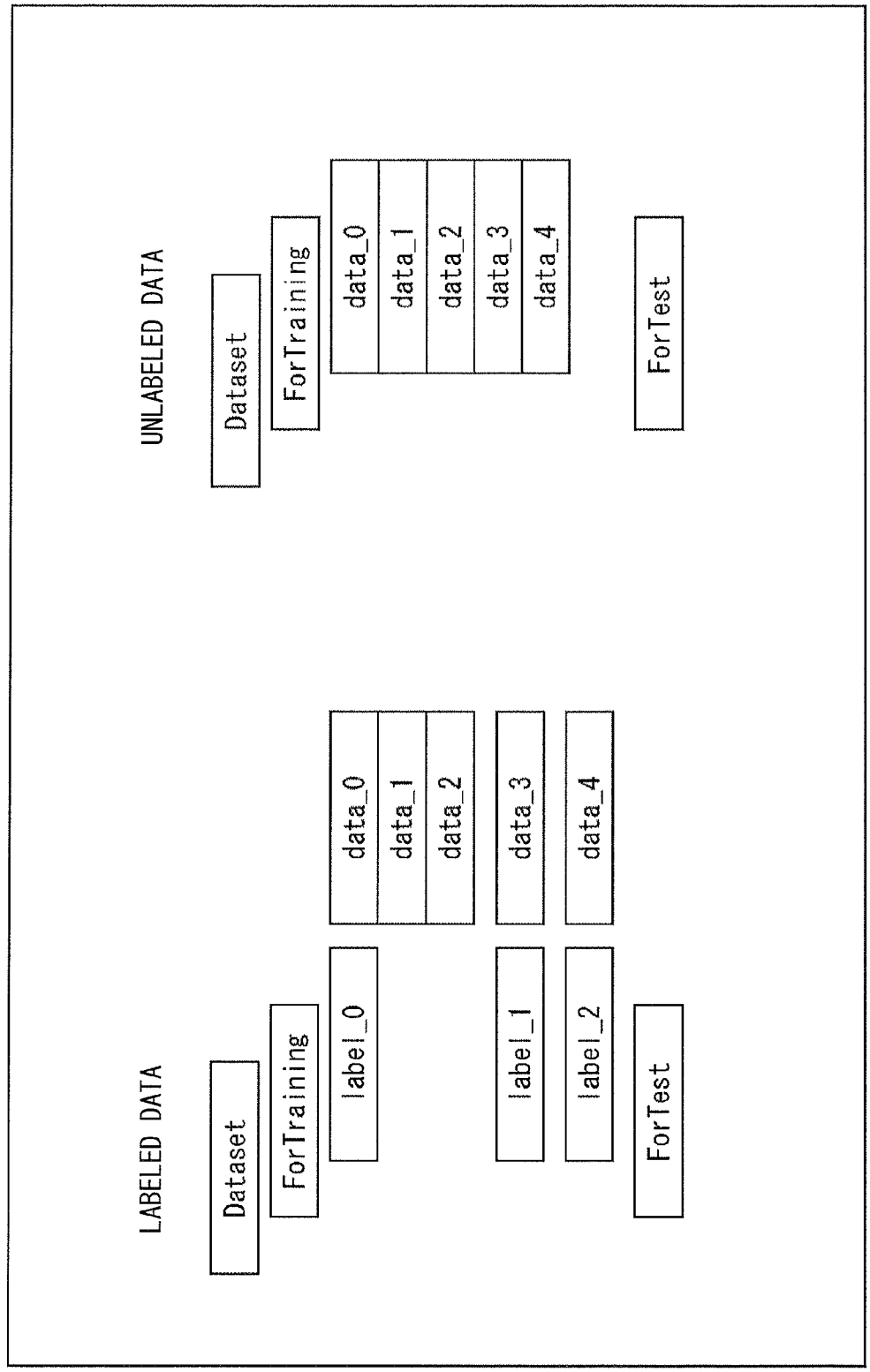
FIG. 19 is a diagram illustrating a second example of the data set in the metric learning.

FIG. 19 is a diagram illustrating a second example of the data set.

A labeled data set illustrated on the left side is the same as the data set in FIG. 12. In a file system including the labeled data set, each file is stored in a directory representing a label.

In contrast, an unlabeled data set illustrated on the right side is the same as the data set in FIG. 9. In a file system including the unlabeled data set, respective files are not divided for each directory representing a label, but are stored in a directory of "ForTraining".

In a case where the data set as illustrated in FIG. 19 is inputted, in the system, on the basis that the data set for learning includes the file system including the labeled data set and the file system including the unlabeled data set, it is estimated to perform semi-supervised learning.

In addition, in the system, the issue to be solved by the user is estimated to be a classification issue on the basis of structures of the file systems. The user may specify the issue to be solved.

3-4-3. Standard Network in Semi-supervised Learning

Figure 20:
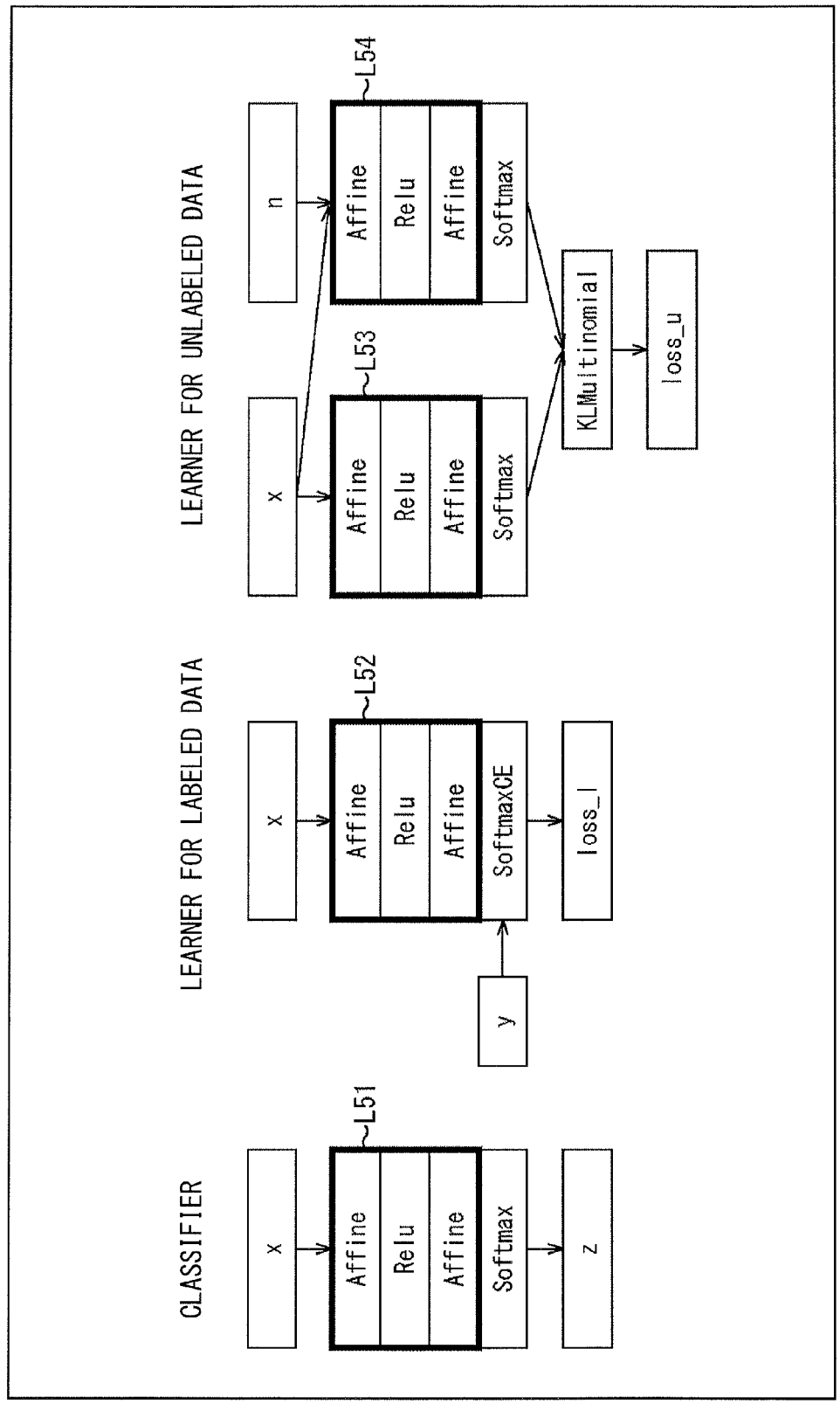
FIG. 20 is a diagram illustrating examples of a classifier and learners.

FIG. 20 is a diagram illustrating examples of a classifier and learners.

In a case where the issue to be solved is a classification issue, a classifier is generated, as illustrated on the left side in FIG. 20. The classifier includes a standard classifier. The standard classifier is configured by superimposing a fully connected layer (an Affine layer), an activation layer (a Relu layer), and a fully connected layer (an Affine layer) in this order from the top. A Softmax function is set to a final layer below the standard classifier to obtain an output representing soft multiclass classification. An input layer (x) and an output layer (z) are added to a network of the standard classifier.

It is to be noted that the classifier illustrated in FIG. 20 is the same network as the classifier in FIG. 14 used in the multiclass classification issue. In a case where the issue to be solved is a binary classification issue, a layer of a Sigmoid function is set instead of the layer of the Softmax function, as described in FIG. 13.

In contrast, as illustrated in the middle and on right side in FIG. 20, two learners, i.e., a learner for labelled data and a learner for unlabeled data are generated. The learners in semi-supervised learning are different networks for labelled data and unlabeled data.

The learner for labelled data is the same as the learner #2 in FIG. 14. The learner for labelled data is configured by adding a layer of a SoftmaxCE function to the standard classifier.

The learner for unlabeled data is configured as a network called VAT (Virtual Adversarial Training). VAT is disclosed in the following literature, for example.

"Distributional Smoothing with Virtual Adversarial Training, Miyato" <https://arxiv.org/abs/1507.00677>

A network of VAT, which is the learner for unlabeled data, is a network in which standard classifiers are disposed side by side as with the Siamese network, and a loss is KL for a multinomial distribution (KLMultinomial). Data x is inputted to a standard classifier surrounded by a thick line L53, and noise n together with the data x is inputted to a standard classifier surrounded by a thick line L54. Semi-supervised learning with use of VAT is performed to determine a probability distribution of the data x and a parameter that smooths a probability distribution of the data x to which the noise n are added.

Parameters are common between parameters of the standard classifier in the classifier, which are surrounded by a thick line L51, and parameters of the standard classifiers in the learners, which are surrounded by thick lines L52, L53, and L54. In a case where the parameters in the learners are updated by learning, the parameters in classifier are also updated in a similar manner.

As described above, in a case where the classification issue is solved by semi-supervised learning, the same learner as the learner #2 in FIG. 14 serves as the learner for labelled data, and the learner including the network of VAT serves as the learner for unlabeled data.

The classifier and the learners as illustrated in FIG. 20 are automatically generated and presented to the user as default networks. Information relating to the three networks may be presented side by side or separately. On a presentation screen of the networks, a message to prompt a change in design, such as "Please remodel this" may be displayed near the standard classifier.

It is to be noted that the noise n is necessary for learning with use of the network of VAT. A noise calculation network, which is a network for generating the noise n, is also automatically generated and presented to the user together with the three networks illustrated in FIG. 20.

Figure 21:
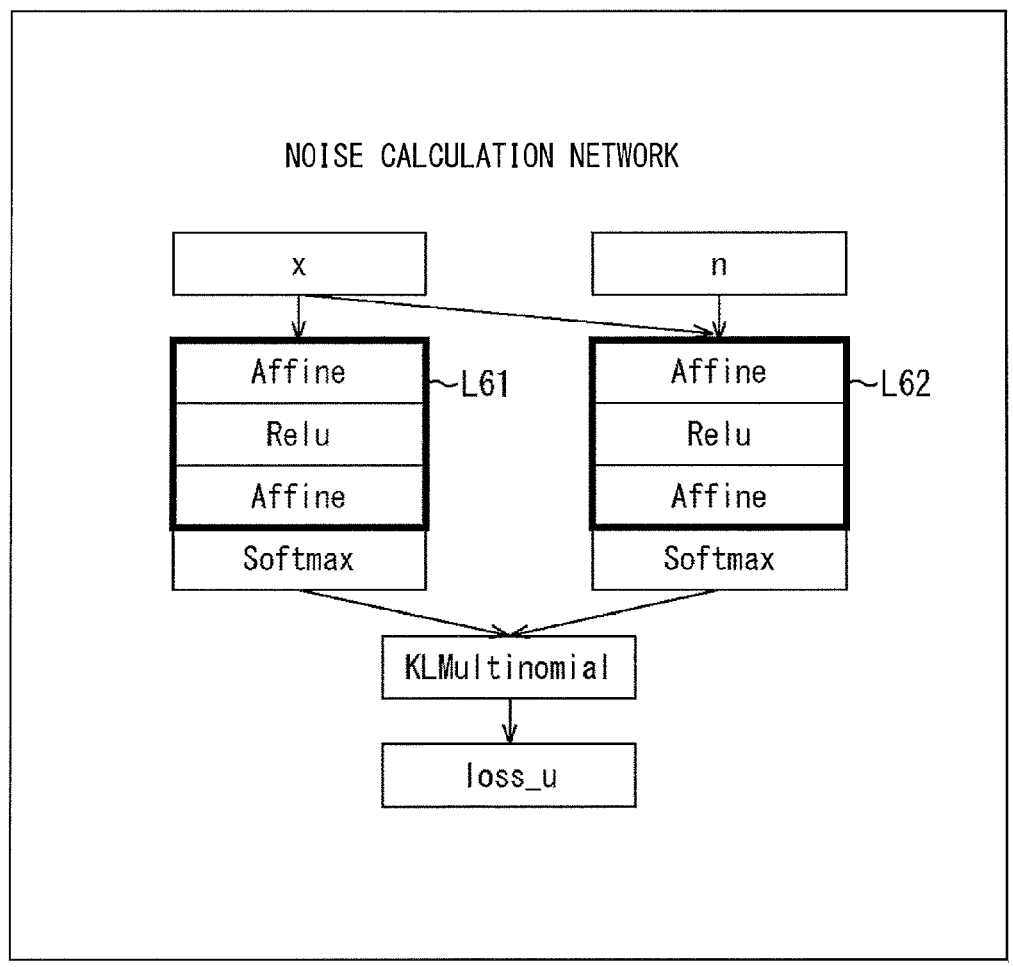
FIG. 21 is a diagram illustrating an example of a noise calculation network.

FIG. 21 is a diagram illustrating an example of the noise calculation network.

As illustrated in FIG. 21, the noise calculation network is a network using a Siamese network for unlabeled data. Parameters are common between parameters of the standard classifier in the noise calculation network, which are surrounded by thick lines L61 and L62 and the parameters of the standard classifier in FIG. 20.

The noise is determined from a loss of the Siamese network for unlabeled data by backpropagation of a gradient relating to the noise. In this backpropagation, setting is performed not to update a parameter of an intermediate layer.

The noise obtained by such a noise calculation network is inputted to the learner for unlabeled data illustrated in FIG. 20, and is used for calculation of a loss.

As described above, upon semi-supervised learning, a network used for calculating the noise necessary for the learner for unlabeled data is also automatically generated as a default network.

Figure 22:
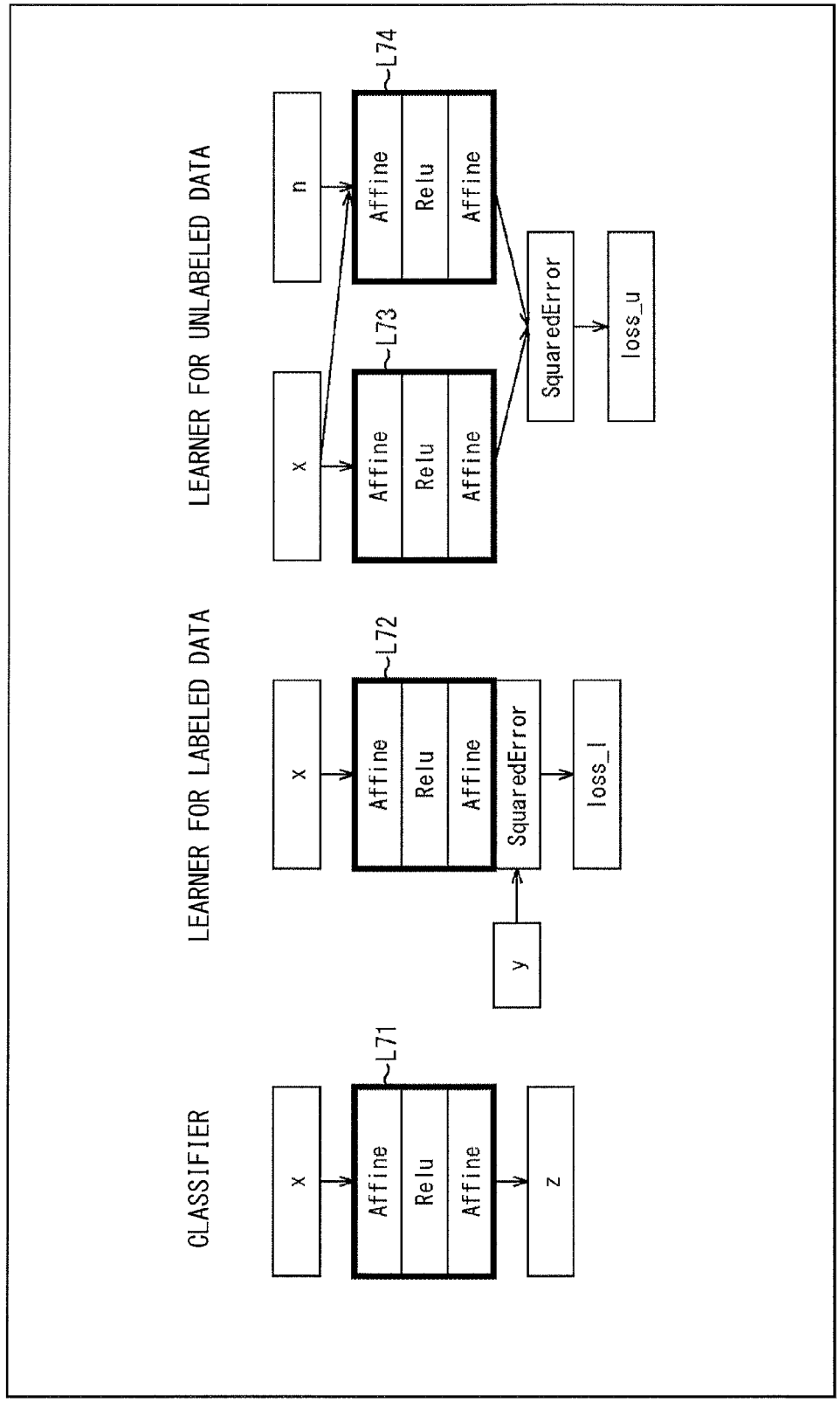
FIG. 22 is a diagram illustrating examples of a predictor and learners.

FIG. 22 is a diagram illustrating examples of a predictor and learners.

In a case where the issue to be solved is a regression issue, a predictor as illustrated on the left side in FIG. 22 is generated. The predictor includes a standard predictor. The standard predictor is configured by superimposing a fully connected layer (an Affine layer), an activation layer (a Relu layer), and a fully connected layer (an Affine layer) in this order from the top. An input layer (x) and an output layer (z) are added to a network of the standard predictor.

It is to be noted that the predictor illustrated in FIG. 22 is the same as the network of the predictor in FIG. 10.

In contrast, as illustrated in the middle and on the right side in FIG. 22, two learners, i.e., a learner for labelled data and a learner for unlabeled data are generated. The two learners illustrated in FIG. 22 are the same as the learner for labelled data and the learner for unlabeled data in FIG. 20, except that the loss function is changed to a squared error function for a regression issue.

That is, the learner for labelled data in FIG. 22 is configured by adding a layer of a squared error function to the final layer of the standard predictor. The learner for labelled data is the same as the learner in FIG. 10.

VAT, which is a learner for unlabeled data, is a network in which standard classifiers are disposed side by side as with the Siamese network, and a loss is a squared error. The data x is inputted to a standard predictor surrounded by a thick line L73, and the noise n together with the data x is inputted to a standard predictor surrounded by a thick line L74.

The noise calculation network used to calculate the noise n is the same as the network described with reference to FIG. 21.

Parameters are common between parameters of the standard predictor in the predictor, which are surrounded by a thick line L71, and parameters of the standard predictors in the learners, which are surrounded by thick lines L72, L73, and L74. In a case where the parameters in the learners are updated by learning, the parameters in the predictor are also updated in a similar manner.

As described above, in a case where the regression issue is solved by semi-supervised learning, the learner described with reference to FIG. 10 serves as the learner for unlabeled data, and the learner including the network of VAT serves as the learner for unlabeled data.

The predictor and the learners as illustrated in FIG. 22 and the noise calculation network in FIG. 21 are automatically generated and presented to the user as default networks. Information relating to the respective networks may be presented side by side or separately. On a presentation screen of the networks, a message to prompt change in design, such as "Please remodel this" may be displayed near the regular predictor.

3-5. Generative Model

3-5-1. Flow of Learning of Generative Model (1) Precondition

The user has data of a domain desired to be generated, and desires to create a generator (a generative model) that generates pseudo-data by inputting a random number.

In this case, the user creates such a generator by providing a data set for learning to the network design support program and causing the network design support program to perform learning. For example, a variable autoencoder (VAE (Variational Auto Encoder)) is used for learning of the generator. The VAE is disclosed in the following literature.

Auto-Encoding Variational Bayes, Kingma, 1312.6114v10 <https://arxiv.org/abs/1312.6114>

In addition, a generative adversarial network (GAN (Generative Adversarial Network)) is used for learning of the generator. The GAN is disclosed in the following literature.

Generative Adversarial Nets, Goodfellow, 1406.2661v1 <https://arxiv.org/abs/1406.2661>

(2) Advance Preparation

The user prepares, in advance, a data set for learning including the data of the domain desired to be generated. Each data of the data set for learning may be unlabeled, but is desirably data of which a domain is narrowed down to some extent.

(3) Execution

The user specifies a learning technology (such as learning with use of the VAE or learning with use of the GAN, and instructs the system to design a generator. It may be estimated by the system that the user is about to create a generator on the basis of the data set for learning. In this case, it is unnecessary to provide an instruction for design of the generator.

In the system, a standard generator and a standard learner are generated. The standard learner is generated by adding a standard additional network and a standard loss function to the standard generator.

A structure of the standard generator is identified on the basis of a domain of the data set for learning. A domain of data is estimated on the basis of an extension of a file included in the data set for learning, or the like. The domain may be inputted by the user.

The automatically generated standard generator and the automatically generated standard learner are presented to the user by displaying source codes of networks on a display, or by displaying an image illustrating module structures of the networks.

The user makes a change to the presented networks as necessary, and provides an instruction for execution of learning.

In the system, learning with use of the data set for learning is performed to generate a generator. Finally, the user provides the generator obtained by the learning to outside for use in an application, or the like.

3-5-2. Standard Network of Generator

Figure 23:
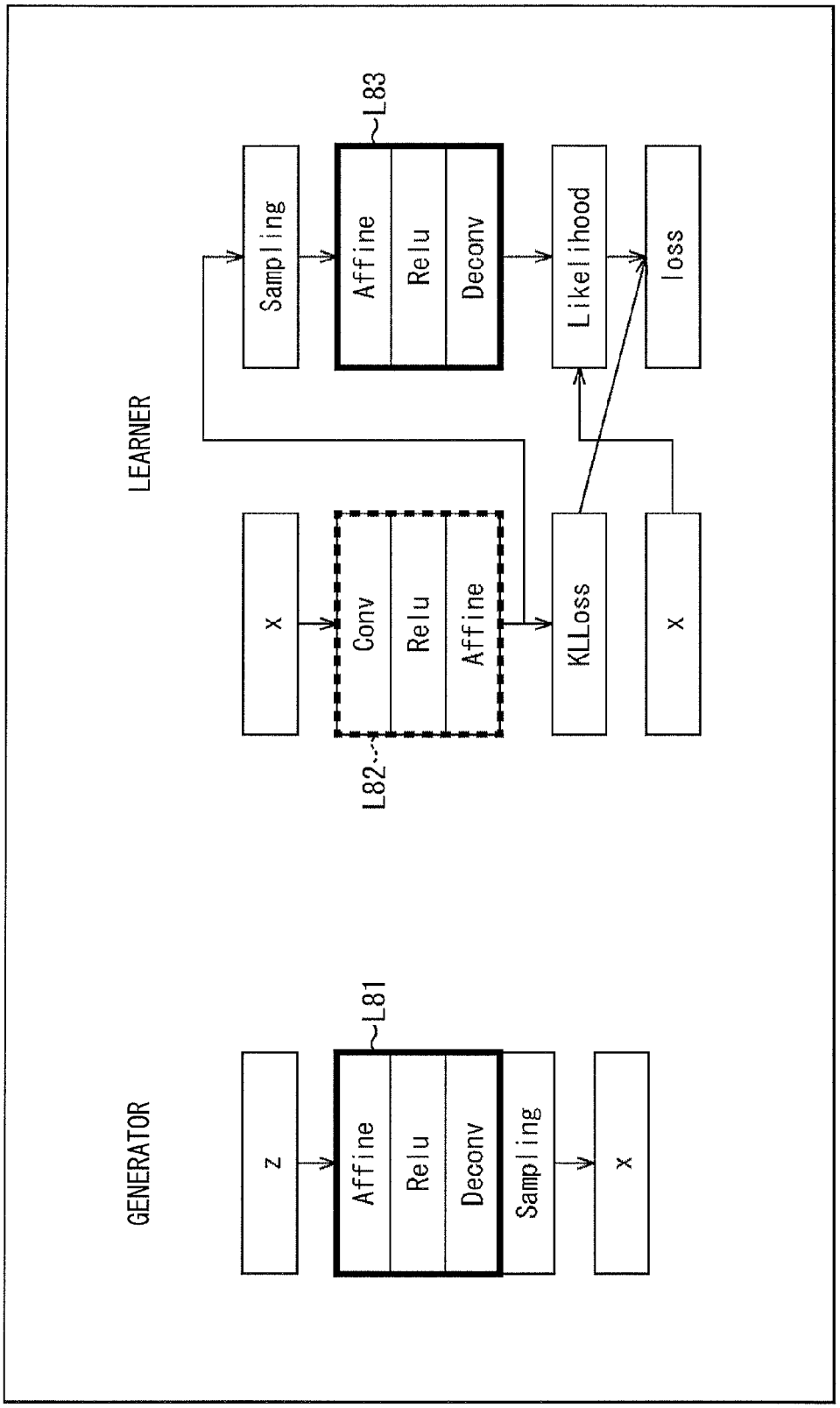
FIG. 23 is a diagram illustrating examples of a generator and a learner using a VAE.

FIG. 23 is a diagram illustrating examples of a generator and a learner using the VAE.

As illustrated on the left side in FIG. 23, the generator includes a standard generator, and is configured as a network that inputs data z, which is a random number (and additional information), and outputs data x, which is pseudo-data. The standard generator is configured by superimposing a fully connected layer (an Affine layer), an activation layer (a Relu layer), and a deconvolution layer (a Deconvolution layer) in order from the top. A sampling layer is set in the standard classifier.

In contrast, as illustrated on the right side in FIG. 23, the learner is configured as a network of a variational autoencoder. A network surrounded by a broken line L82 serves as a network on an encoder side, and a network surrounded by a thick line L83 serves as a network on a decoder side.

The network on the encoder side is an inference model and has parameters different from the parameters of the standard generator surrounded by the thick line L81. An output of the network on the encoder side is coupled to a network of a KL divergence loss, and is coupled to the network on the decoder side via the sampling layer.

The network on the decoder side is the same as the standard generator surrounded by the thick line L81. Parameters are common between the parameters of the network on the decoder side and the parameters of the standard generator. A loss added to the network on the decoder side is a likelihood (Likelihood) based on a parameter of a data distribution.

The KL divergence loss, which is a loss of the output of the network on the encoder side, and the likelihood, which is a loss of the output of the network on the decoder side, are added and outputted as one loss.

The generator and the learner of the VAE as illustrated in FIG. 23 are automatically generated and presented to the user as default networks. Information relating to the two networks may be presented side by side or separately. On a presentation screen of the networks, a message to prompt a change in design, such as "Please remodel this" may be displayed near the standard generator.

Figure 24:
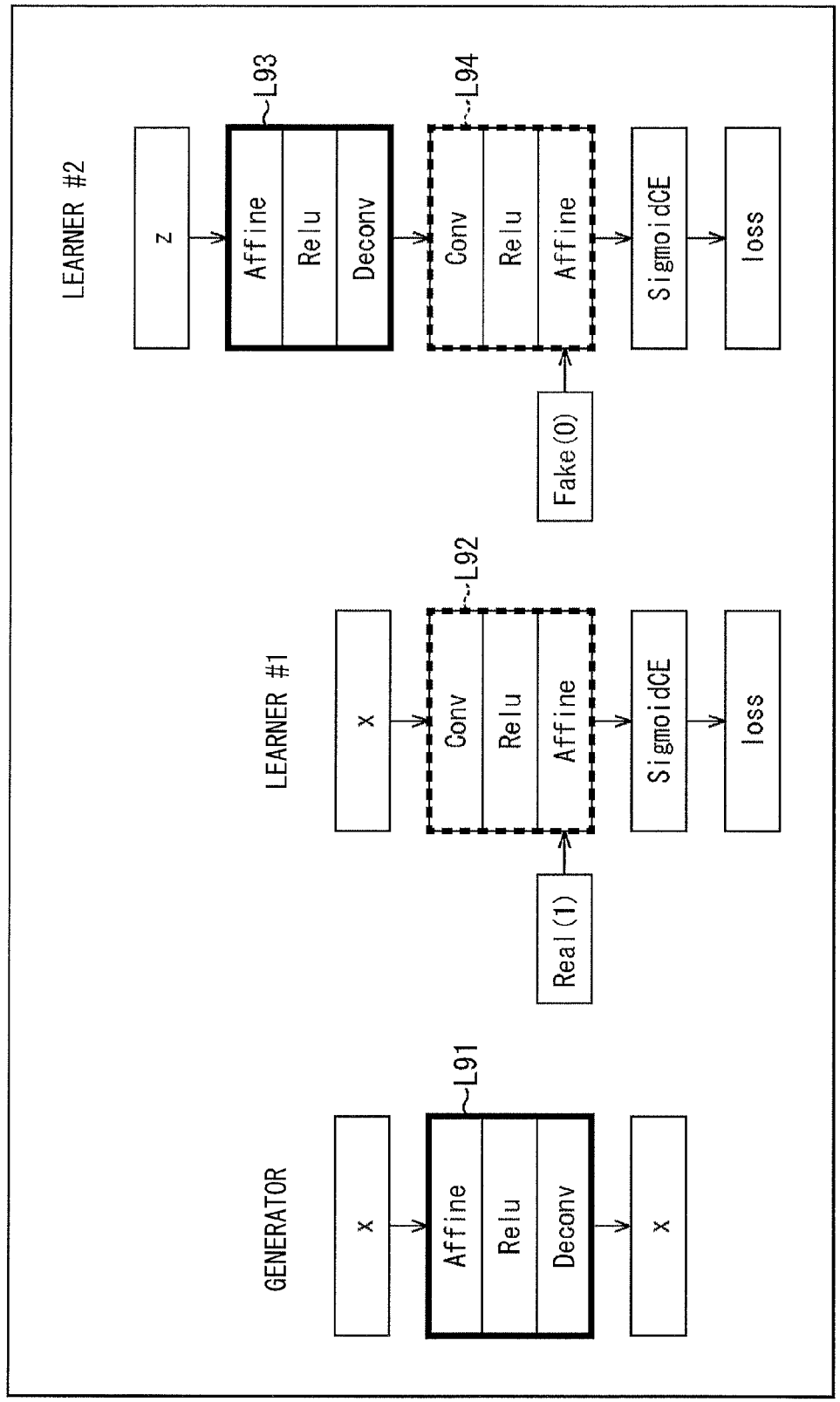
FIG. 24 is a diagram illustrating examples of a generator and learners using a GAN.

FIG. 24 is a diagram illustrating examples of a generator and a learner using the GAN.

The generator illustrated on the left side in FIG. 24 is the same as the generator in FIG. 23 except that no sampling layer is provided.

In contrast, as illustrated in the middle and on right side in FIG. 24, two learners, i.e., a learner #1 and a learner #2 are generated.

The learner #1 has a network as a "discriminator", which is configured by superimposing a convolution layer (a Convolution layer), an activation layer (a Relu layer), and a fully connected layer (an Affine layer). A layer of the SigmoidCE function is provided below the "discriminator". Learning by the learner #1 is performed to determine that inputted data x is determined as true data.

The learner #2 is configured by providing the same network as the "discriminator" of the learner #1 (a network surrounded by a broken line L94) below a "generator". The "generator" is a standard generator surrounded by a thick line L93. A layer of a SigmoidCE function is added below the "discriminator".

Data z, which is a random number, is inputted to the "generator", and the "generator" outputs pseudo-data x'. The pseudo-data x' outputted from the "generator" is inputted to the "discriminator". Learning by the learner #2 is performed to determine the pseudo-data x' outputted from the generator as fake data.

Parameters are common between parameters of the standard generator in the generator, which are surrounded by a thick line L91, and parameters of the "generator" in the learner #2, which are surrounded by the thick line L93. In a case where the parameters of the "generator" are updated by learning, the parameters of the generator are also updated in a similar manner. In addition, parameters are common between the parameters of the "discriminator" in the learner #1, which are surrounded by a broken line L92, and the parameters of the "discriminator" in the learner #2, which are surrounded by a broken line L94.

As described above, the GAN includes a network as the "generator" and a network as the "discriminator".

The generator and the learners #1 and 2 as illustrated in FIG. 24 are automatically generated and presented to the user as default networks. Information relating to the three networks may be presented side by side or separately. On a presentation screen of the networks, a message to prompt a change in design, such as "Please remodel this" may be displayed near the standard generator ("generator") and the "discriminator".

In a case where the user is about to create a generator, the network of the VAE in FIG. 23 or the network of the GAN in FIG. 24 is automatically created. The user may be allowed to select which network is to be automatically created.

3-6. Estimation of Issue

Estimation of an issue to be solved by the user is performed by estimating the issue as a regression issue in a case where the type of the label is a continuous value, and estimating the issue as a classification issue in a case where the type of the label is a discrete value, as described with reference to FIG. 15, and the like. Hereinafter, description is given of estimation processing in a case where an issue, such as semi-supervised learning, other than the above-described issues is included.

Figure 7:
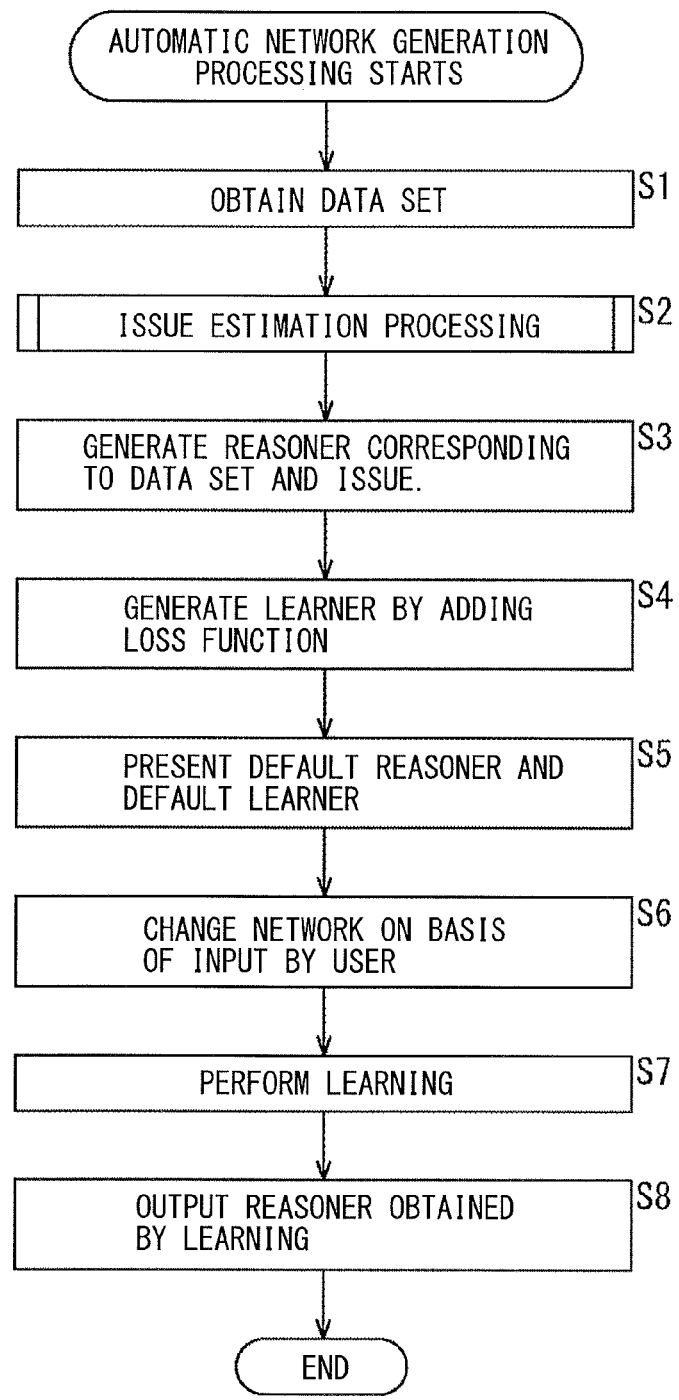
FIG. 7 is a flowchart for describing automatic network generation processing.
Figure 25:
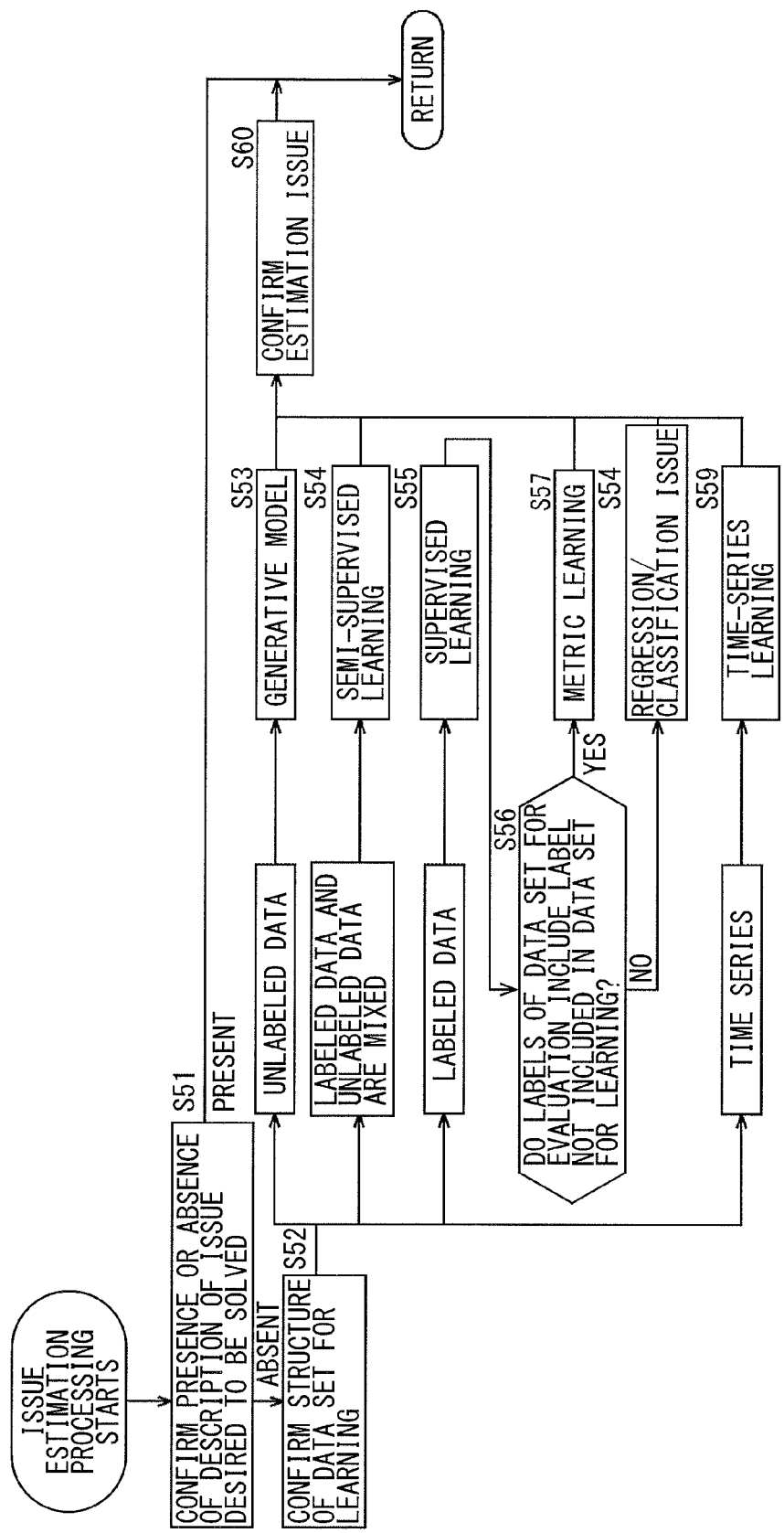
FIG. 25 is a flowchart for describing issue estimation processing performed in step S2 of FIG. 7.

Description is given of the issue estimation processing performed in the step S2 of FIG. 7 with reference to a flowchart in FIG. 25.

In step S51, the issue estimating unit 141 determines whether or not the data set obtained in the step S1 includes description of an issue desired to be solved. For example, in a case where a file specifying an issue to be solved by the user is included in the data set, in a case where a structure of a file system of the data set is a structure specifying a specific issue, or the like, it is determined that the description of the issue desired to be solved is included.

In a case where it is determined in the step S51 that the description of the issue desired to be solved is included in the data set, the processing returns to the step S3 in FIG. 7, and subsequent processing is performed. In the step S3, a reasoner corresponding to the issue specified by the data set is generated.

In contrast, in a case where it is determined in the step S51 that the description of the issue desired to be solved is not included in the data set, in step S52, the issue estimating unit 141 confirms the structure of the data set for learning.

In a case where the data set for learning does not include labelled data and includes unlabeled data, in step S53, the issue estimating unit 141 determines that the issue to be solved by the user is an issue using a generative model.

In addition, in a case where labelled data and unlabeled data are mixed in the data set for learning, in step S54, the issue estimating unit 141 determines that the issue to be solved by the user is an issue using semi-supervised learning. Whether a regression issue or a classification issue is to be solved with use of semi-supervised learning is determined on the basis of the type of the label as described above.

In a case where the data set for learning does not include unlabeled data and includes labelled data, in step S55, the issue estimating unit 141 estimates that the issue to be solved by the user is an issue using supervised learning.

After estimating that the issue to be solved by the user is the issue using supervised learning, in step S56, the issue estimating unit 141 determines whether or not labels of the data set for evaluation include a label not included in the data set for learning Herein, labels included in the data set for evaluation and labels included in the data set for learning are compared to determine whether or not the labels included in both data sets are the same as each other.

In a case where it is determined in the step S56 that the labels of the data set for evaluation include the label not included in the data set for learning, in step S57, the issue estimating unit 141 determines that the issue to be solved by the user is an issue using metric learning. For example, in a case where the feature extractor obtained by metric learning is used in the above-described facial identification application, a range of person IDs (labels) included in the data set for evaluation and a range of person IDs included in the data set for learning are different from each other.

It is to be noted that, in a case where data included in the data set for learning are a moving image file and a label is a value specifying a position (a region) of an object, the issue to be solved by the user may be determined as metric learning.

In contrast, in a case where it is determined in the step S56 that the labels of the data set for evaluation label do not include the label not included in the data set for learning, in step S58, the issue estimating unit 141 determines that the issue to be solved by the user is a regression issue or a classification issue. Whether the issue to be solved is a regression issue or a classification issue is determined on the basis of the type of the label as described above.

It is to be noted that even in a case where the data set inputted by the user includes only the data set for learning, and does not include the data set for evaluation, it is determined that the labels of the data set for evaluation do not include the label not included in the data set for learning.

In a case where data included in the data set for learning is time-series data, in step S59, the issue estimating unit 141 estimates that issue to be solved by the user is an issue of learning using the time-series data. The learning using the time-series data will be described later.

After the issue to be solved by the user is estimated as any one of the issue using the generative model, the issue using semi-supervised learning, the issue using metric learning, the regression issue, the classification issue, and the issue of learning using the time-series data, the processing proceeds to step S60.

In the step S60, the presentation controlling unit 143 displays a message such as "it is estimated that the issue is an OO issue, therefore, an OO network is proposed" on a screen of the network design support program, and confirms whether or not a result of estimation of the issue is correct. For example, in a case where the result of estimation of the issue is incorrect, a correct issue is specified by the user.

After it is confirmed whether or not the result of estimation of the issue is correct, the processing returns to the step S3 of FIG. 7, and subsequent processing is performed.

As described above, the issue to be solved by the user is estimated by the system, which allows the user to easily design a network with no necessity for the user to specify the issue.

4. Others

4-1. Time-series Data

It is possible to use time-series data as data included in the data set for learning. In a case where data included in the data set for learning is time-series data, processing similar to the above processing is performed with use of data (snap shot data) at respective times included in the time-series data.

That is, the issue of learning using the time-series data is processing using a network in which the predictor, the classifier, the feature extractor, and the generator described above are extended in a time-series direction. In order to extend a structure of the network in the time-series direction, a network including a default unit called a LSTM or a GRU is used.

A standard reasoner and a standard learner corresponding to the issue to be solved by learning using the time-series data are generated, and presented to the user. Networks generated as the standard reasoner and the standard learner are the same as the network corresponding to each of the issues described above. Learning of the reasoner is performed with use of the snap shot data.

4-2. Modification Examples

A network automatically generated by the system as a default network is not limited to the networks described above.

For example, in a case where the issue to be solved by the user is a regression issue, it is possible to generate, as a default network, a network different from the network illustrated in FIG. 10. In addition, in a case where the issue to be solved by the user is a classification issue, it is possible to generate, as a default network, a network different from the network illustrated in FIG. 13 or FIG. 14.

That is, as long as the network is a network in accordance with an established way of design, it is possible to generate, as a default network, a network to which another loss function is added. In addition, it is possible to generate, as a default network, a network having another structure.

For example, in a case where the issue to be solved is an issue using metric learning, instead of the above-described siamese network or the above-described triplet network, a network derived from the siamese network or the triplet network may be generated as a learner. In addition, in a case where the issue to be solved is a regression issue or a classification issue using semi-supervised learning, instead of the above-described network of VAT, a network derived from the network of VAT may be generated as a learner. Further, in a case where the issue to be solved is an issue using a generative model, instead of the network of the variational autoencoder or the GAN described above, a network derived from the network or the GAN may be generated as a learner.

The network design support program executed by the PC 1 may be a program in which processing is performed chronologically in the order described in this specification, or may be a program in which processing is performed in parallel or at necessary timings such as when the processing is invoked.

The network design support program is executed in the PC 1; however, an apparatus in which the network design support program is installed and executed is not limited to PCs. That is, it is possible to execute the network design support program in a mobile terminal such as a smartphone or a tablet terminal.

It is to be noted that a "system" in this specification means a group of a plurality of components (such as apparatuses and modules (parts)) regardless of whether or not all of the components are in the same housing. Accordingly, a plurality of apparatuses that are accommodated in separate housings and coupled to each other via a network, and a single apparatus including a plurality of modules accommodated in one housing are both regarded as the system.

It is to be noted that the effects described herein are merely illustrative and non-limiting, and other effects may be provided.

An embodiment of the present technology is not limited to the embodiment described above, and may be modified in variety of ways in a scope without departing from the gist of the present technology.

For example, it is possible for the present technology to adopt a configuration of cloud computing in which one function is distributed to a plurality of apparatuses via a network and processed in cooperation.

In addition, for example, it is possible to execute the respective steps described in the flowcharts described above with one apparatus, and it is also possible to distribute the respective steps to a plurality of apparatuses for execution.

Further, in a case where a plurality of processing is included in one step, it is possible to execute the plurality of processing included in the one step with one apparatus, and it is also possible to distribute the plurality of processing to a plurality of apparatuses for execution.

<4-3. Configuration Combination Examples>

The present technology may also have the following configurations.

(1)

A program causing a computer to serve as:

a generating unit that generates, in response to specification of a data set including data for learning, a network for inference execution and a network for learning corresponding to the data set; and a learning unit that inputs the data for learning to the network for learning and performs learning of the network for inference execution.

(2)

The program according to (1), in which the generating unit generates the network for inference execution and the network for learning that have a structure corresponding to a domain of the data for learning.

(3)

The program according to (2), in which the generating unit generates the network for inference execution and the network for learning that have a convolution layer in a case where the domain of the data for learning is an image or sound, and generates the network for inference execution and the network for learning that have a fully connected layer in a case where the domain of the data for learning is an item or a text.

(4)

The program according to any one of (1) to (3), in which the generating unit generates the network for learning by adding a loss function corresponding to an issue to be solved by inference to the network for inference execution.

(5)

The program according to (4), in which the generating unit adds a squared error function in a case where the issue is a regression issue and adds a cross entropy function in a case where the issue is a classification issue.

(6)

The program according to (4), in which, in a case where the issue is an issue using metric learning, the generating unit generates, as the network for learning, a siamese network or a triplet network that includes a network sharing a parameter with the network for inference execution, or a network derived from the siamese network or the triplet network.

(7)

The program according to (4), in which, in a case where the issue is a regression issue or a classification issue using semi-supervised learning, the generating unit generates, as the network for learning, a network of VAT that includes a network sharing a parameter with the network for inference execution, or a network derived from the network of VAT.

(8)

The program according to (4), in which, in a case where the issue is an issue using a generative model, the generating unit generates, as the network for learning, a network of a variational autoencoder or a GAN that includes a network sharing a parameter with the network for inference execution or a network derived from the network of the variational autoencoder or the GAN.

(9)

The program according to any one of (4) to (8), in which an issue estimating unit is further included, the issue estimating unit that estimates the issue on the basis of contents of the data set.

(10)

The program according to (9), in which the issue estimating unit estimates the issue as a regression issue in a case where a true label in the data set is a continuous value, and estimates the issue as a classification issue in a case where the true label in the data set is a discrete value.

(11)

The program according to (9), in which the issue estimating unit estimates the issue as an issue using metric learning in a case where the data set includes the data for learning and data for evaluation and a range of a value of a true label differs between the data for learning data and the data for evaluation.

(12)

The program according to (9), in which the issue estimating unit estimates the issue as a regression issue or a classification issue using semi-supervised learning in a case where the data set includes data including a true label and data not including a true label as the data for learning.

(13)

The program according to (9), in which the issue estimating unit estimates the issue as an issue using a generative model in a case where the data for learning does not include a true label.

(14)

The program according to (9), in which the issue estimating unit estimates the issue on the basis of data that is included in the data set and specifies the issue.

(15)

The program according to any one of (1) to (14), in which a presentation controlling unit is further included, the presentation controlling unit that presents information relating to the network for inference execution and the network for learning generated by the generating unit.

(16)

The program according to (15), in which the presentation controlling unit presents an image illustrating source codes of the network for inference execution and the network for learning, or module structures of the network for inference execution and the network for learning.

(17)

The program according to (15) or (16), in which the generating unit changes design of the presented network for inference execution and the presented network for learning in response to an input by a user.

(18)

The program according to any one of (1) to (17), in which generation of the network for inference execution and the network for learning by the generating unit is performed after the data set is specified regardless of an operation by a user.

(19)

An information processing method that is performed by an information processing apparatus, the method including:

generating, in response to specification of a data set including data for learning, a network for inference execution and a network for learning corresponding to the data set; and inputting the data for learning to the network for learning and performing learning of the network for inference execution.

(20)

An information processing apparatus including:

a generating unit that generates, in response to specification of a data set including data for learning, a network for inference execution and a network for learning corresponding to the data set; and a learning unit that inputs the data for learning to the network for learning and performs learning of the network for inference execution.

REFERENCE SIGNS LIST

1: PC
2: provision server
131: information processing unit
141: issue estimating unit
142: network generating unit
143: presentation controlling unit
144: learning executing unit

The invention claimed is:

1. A non-transitory computer-readable storage medium storing computer-readable instructions thereon which, when executed by a computer, cause the computer to perform a method, the method comprising:

receiving a data set including data for learning;
automatically identifying an issue to be solved based on the received data set, wherein automatically identifying the issue to be solved includes
determining a structure of the data set for learning;
in response to the data set for learning including only unlabeled data, determining that the issue to be solved uses a generative model;

in response to the data set for learning including a mix of labeled and unlabeled data, determining that the issue to be solved uses semi-supervised learning; and in response to the data set for learning including only labeled data, determining that the issue to be solved uses supervised learning;

automatically generating, based on the issue to be solved and in response to specification of only the received data set including data for learning, a network for inference execution and a network for learning corresponding to the data set; and inputting the data for learning to the network for learning and performing learning of the network for inference execution.

2. The program according to claim 1, wherein the generating unit generates the network for inference execution and the network for learning that have a structure corresponding to a domain of the data for learning.

3. The program according to claim 2, wherein the generating unit generates the network for inference execution and the network for learning that have a convolution layer in a case where the domain of the data for learning is an image or sound, and generates the network for inference execution and the network for learning that have a fully connected layer in a case where the domain of the data for learning is an item or a text.

4. The non-transitory computer-readable storage medium according to claim 1, further comprising:
generating the network for learning by adding a loss function corresponding to an issue to be solved by inference to the network for inference execution.

5. The non-transitory computer-readable storage medium according to claim 4, further comprising:
adding a squared error function in a case where the issue is a regression issue and adding a cross entropy function in a case where the issue is a classification issue.

6. The non-transitory computer-readable storage medium according to claim 4, further comprising:
in a case where the issue is an issue using metric learning, generating, as the network for learning, a siamese network or a triplet network that includes a network sharing a parameter with the network for inference execution, or a network derived from the siamese network or the triplet network.

7. The non-transitory computer-readable storage medium according to claim 4, further comprising:
in a case where the issue is a regression issue or a classification issue using semi-supervised learning, generating, as the network for learning, a network of VAT that includes a network sharing a parameter with the network for inference execution, or a network derived from the network of VAT.

8. The non-transitory computer-readable storage medium according to claim 4, further comprising:
in a case where the issue is an issue using a generative model, generating, as the network for learning, a network of a variational autoencoder or a GAN that includes a network sharing a parameter with the network for inference execution or a network derived from the network of the variational autoencoder or the GAN.

9. The non-transitory computer-readable storage medium according to claim 1, further comprising:
estimating the issue as a regression issue in a case where a true label in the data set is a continuous value, and estimating the issue as a classification issue in a case where the true label in the data set is a discrete value.

10. The non-transitory computer-readable storage medium according to claim 1, further comprising:
estimating the issue as an issue using metric learning in a case where the data set includes the data for learning and data for evaluation and a range of a value of a true label differs between the data for learning data and the data for evaluation.

11. The non-transitory computer-readable storage medium according to claim 1, further comprising:
estimating the issue on a basis of data that is included in the data set and specifies the issue.

12. The program according to claim 1, wherein a presentation controlling unit is further included, the presentation controlling unit that presents information relating to the network for inference execution and the network for learning generated by the generating unit.

13. The program according to claim 12, wherein the presentation controlling unit presents an image illustrating source codes of the network for inference execution and the network for learning, or module structures of the network for inference execution and the network for learning.

14. The program according to claim 12, wherein the generating unit changes design of the presented network for inference execution and the presented network for learning in response to an input by a user.

15. The program according to claim 1, wherein generation of the network for inference execution and the network for learning by the generating unit is performed after the data set is specified regardless of an operation by a user.

16. An information processing method that is performed by an information processing apparatus, the method comprising:
receiving a data set including data for learning;
automatically identifying an issue to be solved based on the received data set, wherein automatically identifying the issue to be solved includes
determining a structure of the data set for learning;
in response to the data set for learning including only unlabeled data, determining that the issue to be solved uses a generative model;
in response to the data set for learning including a mix of labeled and unlabeled data, determining that the issue to be solved uses semi-supervised learning; and
in response to the data set for learning including only labeled data, determining that the issue to be solved uses supervised learning;
automatically generating, based on the issue to be solved and in response to specification of only the received data set including data for learning, a network for inference execution and a network for learning corresponding to the data set; and
inputting the data for learning to the network for learning and performing learning of the network for inference execution.

17. An information processing apparatus comprising:
processing circuitry configured to
receive a data set including data for learning,
automatically identify an issue to be solved based on the received data set, wherein the circuitry for automatically identifying the issue to be solved is further configured to
determine a structure of the data set for learning,
in response to the data set for learning including only unlabeled data, determine that the issue to be solved uses a generative model, in response to the data set for learning including a mix of labeled and unlabeled data, determine that the issue to be solved uses semi-supervised learning, and in response to the data set for learning including only labeled data, determine that the issue to be solved uses supervised learning, automatically generate, based on the issue to be solved and in response to specification of only the received data set including data for learning, a network for inference execution and a network for learning corresponding to the data set; and input the data for learning to the network for learning and perform learning of the network for inference execution.

* * * * *